(12) United States Patent
Lang et al.

(10) Patent No.: US 11,481,744 B2
(45) Date of Patent: Oct. 25, 2022

(54) DISCOVERY AND MEDIA CONTROL AT A POINT-OF-SALE DISPLAY

(71) Applicant: Sonos, Inc., Santa Barbara, CA (US)

(72) Inventors: Jonathan Lang, Santa Barbara, CA (US); Deborah DuBois, Santa Barbara, CA (US)

(73) Assignee: Sonos, Inc., Santa Barbara, CA (US)

( * ) Notice: Subject to any disclaimer, the term of this patent is extended or adjusted under 35 U.S.C. 154(b) by 316 days.

(21) Appl. No.: 16/416,504

(22) Filed: May 20, 2019

(65) Prior Publication Data
US 2019/0340593 A1 Nov. 7, 2019

Related U.S. Application Data

(63) Continuation of application No. 14/042,160, filed on Sep. 30, 2013, now Pat. No. 10,296,884.

(51) Int. Cl.
*G06Q 20/20* (2012.01)
*H04L 41/12* (2022.01)
*G07G 1/00* (2006.01)
*G06Q 20/32* (2012.01)

(52) U.S. Cl.
CPC ........... *G06Q 20/20* (2013.01); *G06Q 20/209* (2013.01); *G06Q 20/322* (2013.01); *G07G 1/0009* (2013.01); *H04L 41/12* (2013.01); *H04R 2420/07* (2013.01)

(58) Field of Classification Search
CPC .... G06F 3/0482; G06F 3/165; G06F 16/4387; G06F 3/04842; G06F 3/0488; G06F 3/167; G06F 3/0484; G06Q 20/20
See application file for complete search history.

(56) References Cited

U.S. PATENT DOCUMENTS

| | | |
|---|---|---|
| 5,440,644 A | 8/1995 | Farinelli et al. |
| 5,732,275 A | 3/1998 | Kullick et al. |
| 5,761,320 A | 6/1998 | Farinelli et al. |
| 5,764,992 A | 6/1998 | Kullick et al. |
| 5,923,902 A | 7/1999 | Inagaki |
| 5,978,855 A | 11/1999 | Metz et al. |
| 6,032,202 A | 2/2000 | Lea et al. |
| 6,256,554 B1 | 7/2001 | DiLorenzo |
| 6,404,811 B1 | 6/2002 | Cvetko et al. |
| 6,469,633 B1 | 10/2002 | Wachter et al. |
| 6,522,886 B1 | 2/2003 | Youngs et al. |
| 6,611,537 B1 | 8/2003 | Edens et al. |
| 6,631,410 B1 | 10/2003 | Kowalski et al. |
| 6,640,284 B1 | 10/2003 | Shaw et al. |

(Continued)

FOREIGN PATENT DOCUMENTS

| | | |
|---|---|---|
| EP | 1389853 A1 | 2/2004 |
| WO | 1998006055 A1 | 2/1998 |

(Continued)

OTHER PUBLICATIONS

Advisory Action dated Aug. 24, 2016, issued in connection with U.S. Appl. No. 14/042,160, filed Sep. 30, 2013, 6 pages.

(Continued)

*Primary Examiner* — Florian M Zeender
*Assistant Examiner* — Milena Racic
(74) *Attorney, Agent, or Firm* — Akerman LLP

(57) ABSTRACT

Example techniques relate to discovery and media control at a point-of-sale display.

20 Claims, 7 Drawing Sheets

(56) References Cited

U.S. PATENT DOCUMENTS

| | | | |
|---|---|---|---|
| 6,728,531 B1 | 4/2004 | Lee et al. | |
| 6,757,517 B2 | 6/2004 | Chang et al. | |
| 6,778,869 B2 | 8/2004 | Champion | |
| 7,130,608 B2 | 10/2006 | Hollstrom et al. | |
| 7,130,616 B2 | 10/2006 | Janik | |
| 7,143,939 B2 | 12/2006 | Henzerling | |
| 7,236,773 B2 | 6/2007 | Thomas | |
| 7,295,548 B2 | 11/2007 | Blank et al. | |
| 7,391,791 B2 | 6/2008 | Balassanian et al. | |
| 7,483,538 B2 | 1/2009 | McCarty et al. | |
| 7,571,014 B1 | 8/2009 | Lambourne et al. | |
| 7,630,501 B2 | 12/2009 | Blank et al. | |
| 7,643,894 B2 | 1/2010 | Braithwaite et al. | |
| 7,657,910 B1 | 2/2010 | Mcaulay et al. | |
| 7,853,341 B2 | 12/2010 | McCarty et al. | |
| 7,987,294 B2 | 7/2011 | Bryce et al. | |
| 8,014,423 B2 | 9/2011 | Thaler et al. | |
| 8,045,952 B2 | 10/2011 | Qureshey et al. | |
| 8,103,009 B2 | 1/2012 | Mccarty et al. | |
| 8,234,395 B2 | 7/2012 | Millington et al. | |
| 8,243,141 B2 | 8/2012 | Greenberger et al. | |
| 8,290,603 B1 | 10/2012 | Lambourne | |
| 8,473,865 B2 * | 6/2013 | Huang | H03J 1/0025 715/810 |
| 8,483,853 B1 | 7/2013 | Lambourne | |
| 8,543,665 B2 * | 9/2013 | Ansari | H04L 12/66 709/218 |
| 8,750,677 B2 * | 6/2014 | Brown | H04N 21/41407 386/241 |
| 8,768,252 B2 * | 7/2014 | Watson | H04L 1/16 455/3.06 |
| 8,886,933 B1 | 11/2014 | Poiesz et al. | |
| 8,923,997 B2 * | 12/2014 | Kallai | G06F 11/3419 700/94 |
| 8,938,675 B2 * | 1/2015 | Holladay | H04L 41/0803 715/717 |
| 8,942,252 B2 | 1/2015 | Balassanian et al. | |
| 9,141,645 B2 * | 9/2015 | Lambourne | G06F 3/162 |
| 9,665,339 B2 | 5/2017 | Reimann et al. | |
| 9,735,978 B2 * | 8/2017 | Kumar | H04N 21/4825 |
| 9,798,510 B2 * | 10/2017 | Kumar | H04L 12/4625 |
| 10,008,108 B2 * | 6/2018 | Cho | H04L 12/2818 |
| 10,055,491 B2 * | 8/2018 | Tripoli | G06F 16/78 |
| 10,715,973 B2 * | 7/2020 | Kumar | H04L 12/2834 |
| 10,839,795 B2 * | 11/2020 | Torok | G10L 15/22 |
| 2001/0042107 A1 | 11/2001 | Palm | |
| 2002/0022453 A1 | 2/2002 | Balog et al. | |
| 2002/0026442 A1 | 2/2002 | Lipscomb et al. | |
| 2002/0124097 A1 | 9/2002 | Isely et al. | |
| 2002/0142815 A1 | 10/2002 | Candelore | |
| 2003/0025689 A1 | 2/2003 | Kim | |
| 2003/0083925 A1 | 5/2003 | Weaver et al. | |
| 2003/0135381 A1 | 7/2003 | Mathiesen et al. | |
| 2003/0157951 A1 | 8/2003 | Hasty | |
| 2004/0024478 A1 | 2/2004 | Hans et al. | |
| 2004/0117631 A1 | 6/2004 | Colvin | |
| 2004/0117644 A1 | 6/2004 | Colvin | |
| 2004/0117663 A1 | 6/2004 | Colvin | |
| 2004/0117664 A1 | 6/2004 | Colvin | |
| 2004/0181818 A1 | 9/2004 | Heyner et al. | |
| 2004/0225894 A1 | 11/2004 | Colvin | |
| 2005/0015760 A1 | 1/2005 | Ivanov et al. | |
| 2006/0041887 A1 | 2/2006 | Dusio | |
| 2006/0059434 A1 | 3/2006 | Boss et al. | |
| 2006/0173985 A1 | 8/2006 | Moore | |
| 2007/0028120 A1 | 2/2007 | Wysocki et al. | |
| 2007/0093243 A1 | 4/2007 | Kapadekar et al. | |
| 2007/0136679 A1 * | 6/2007 | Yang | H04N 21/4325 348/E5.102 |
| 2007/0142944 A1 | 6/2007 | Goldberg et al. | |
| 2008/0081558 A1 * | 4/2008 | Dunko | H04N 21/8355 |
| 2008/0091717 A1 * | 4/2008 | Garbow | G06F 16/68 |
| 2009/0061890 A1 | 3/2009 | Andreasson et al. | |
| 2009/0094540 A1 | 4/2009 | Gray et al. | |
| 2009/0247195 A1 | 10/2009 | Palmer et al. | |
| 2010/0009674 A1 | 1/2010 | Sapkota et al. | |
| 2010/0031366 A1 | 2/2010 | Knight et al. | |
| 2010/0042235 A1 | 2/2010 | Basso et al. | |
| 2010/0070490 A1 * | 3/2010 | Amidon | G11B 27/34 707/722 |
| 2010/0082725 A1 | 4/2010 | Onishi et al. | |
| 2010/0082731 A1 | 4/2010 | Haughay et al. | |
| 2010/0094833 A1 | 4/2010 | Svendsen et al. | |
| 2010/0095332 A1 | 4/2010 | Gran et al. | |
| 2010/0163613 A1 | 7/2010 | Bucher et al. | |
| 2010/0206815 A1 | 8/2010 | Garusi et al. | |
| 2010/0211438 A1 | 8/2010 | Lutnick et al. | |
| 2010/0250669 A1 | 9/2010 | Pan et al. | |
| 2010/0284389 A1 * | 11/2010 | Ramsay | H04R 5/02 370/338 |
| 2010/0299402 A1 | 11/2010 | Korman et al. | |
| 2010/0299639 A1 * | 11/2010 | Ramsay | H04L 12/282 715/835 |
| 2010/0303244 A1 | 12/2010 | Kim et al. | |
| 2010/0306815 A1 | 12/2010 | Emerson et al. | |
| 2011/0004330 A1 | 1/2011 | Rothkopf et al. | |
| 2011/0047574 A1 | 2/2011 | Tecot et al. | |
| 2011/0054641 A1 | 3/2011 | Hur et al. | |
| 2011/0055901 A1 | 3/2011 | Karaoguz et al. | |
| 2011/0060998 A1 | 3/2011 | Schwartz et al. | |
| 2011/0066943 A1 | 3/2011 | Brillon et al. | |
| 2011/0131272 A1 | 6/2011 | Littlejohn et al. | |
| 2011/0131518 A1 | 6/2011 | Ohashi et al. | |
| 2011/0131520 A1 | 6/2011 | Al-Shaykh et al. | |
| 2011/0179455 A1 | 7/2011 | Thompson et al. | |
| 2011/0218656 A1 | 9/2011 | Bishop et al. | |
| 2011/0225496 A1 | 9/2011 | Jeffe et al. | |
| 2012/0116934 A1 | 5/2012 | Chittella | |
| 2012/0147825 A1 | 6/2012 | Hassan et al. | |
| 2012/0159372 A1 | 6/2012 | Stallings et al. | |
| 2012/0174093 A1 | 7/2012 | Davila et al. | |
| 2012/0185770 A1 | 7/2012 | Hwang et al. | |
| 2012/0202485 A1 | 8/2012 | Mirbaha et al. | |
| 2012/0227076 A1 | 9/2012 | Mccoy et al. | |
| 2012/0233067 A1 | 9/2012 | Matthew et al. | |
| 2012/0284423 A1 | 11/2012 | Weel et al. | |
| 2012/0304233 A1 | 11/2012 | Roberts et al. | |
| 2012/0311094 A1 | 12/2012 | Biderman et al. | |
| 2012/0311618 A1 | 12/2012 | Blaxland et al. | |
| 2013/0024018 A1 | 1/2013 | Chang et al. | |
| 2013/0028263 A1 | 1/2013 | Rajapakse et al. | |
| 2013/0073584 A1 | 3/2013 | Kuper et al. | |
| 2013/0082100 A1 | 4/2013 | Stavrou et al. | |
| 2013/0086003 A1 | 4/2013 | Alsina et al. | |
| 2013/0111529 A1 | 5/2013 | Yao et al. | |
| 2013/0117299 A1 | 5/2013 | Kraatz et al. | |
| 2013/0151728 A1 | 6/2013 | Currier et al. | |
| 2013/0157566 A1 | 6/2013 | Oguchi et al. | |
| 2013/0165164 A1 | 6/2013 | Rowe et al. | |
| 2013/0167029 A1 | 6/2013 | Friesen et al. | |
| 2013/0244784 A1 | 9/2013 | Assa et al. | |
| 2013/0246916 A1 | 9/2013 | Reimann et al. | |
| 2013/0254207 A1 | 9/2013 | Coburn, IV et al. | |
| 2013/0300546 A1 | 11/2013 | Kim et al. | |
| 2013/0326041 A1 | 12/2013 | Bellet et al. | |
| 2013/0346559 A1 | 12/2013 | Van Erven et al. | |
| 2013/0346859 A1 | 12/2013 | Bates et al. | |
| 2013/0347117 A1 | 12/2013 | Parks et al. | |
| 2014/0006483 A1 | 1/2014 | Garmark et al. | |
| 2014/0006947 A1 | 1/2014 | Garmark et al. | |
| 2014/0052770 A1 | 2/2014 | Gran et al. | |
| 2014/0075308 A1 | 3/2014 | Sanders et al. | |
| 2014/0075314 A1 | 3/2014 | Bachman et al. | |
| 2014/0080479 A1 | 3/2014 | Vangala et al. | |
| 2014/0096166 A1 | 4/2014 | Gordon et al. | |
| 2014/0108929 A1 | 4/2014 | Garmark et al. | |
| 2014/0115462 A1 | 4/2014 | Reznor et al. | |
| 2014/0122737 A1 | 5/2014 | Silberstein et al. | |
| 2014/0123005 A1 | 5/2014 | Forstall et al. | |
| 2014/0140530 A1 | 5/2014 | Gomes-Casseres et al. | |
| 2014/0169569 A1 | 6/2014 | Toivanen et al. | |
| 2014/0195587 A1 | 7/2014 | Sukoff et al. | |
| 2014/0195925 A1 | 7/2014 | Wikander et al. | |

(56) References Cited

U.S. PATENT DOCUMENTS

| | | |
|---|---|---|
| 2014/0209671 A1 | 7/2014 | Finlow-Bates et al. |
| 2014/0215009 A1 | 7/2014 | Zhang et al. |
| 2014/0215334 A1* | 7/2014 | Garmark ............... H04L 65/60 715/716 |
| 2014/0378056 A1 | 12/2014 | Liu et al. |
| 2015/0026613 A1 | 1/2015 | Kwon et al. |
| 2015/0074527 A1 | 3/2015 | Sevigny et al. |
| 2015/0074528 A1 | 3/2015 | Sakalowsky et al. |
| 2015/0142690 A1 | 5/2015 | Sorensen et al. |
| 2015/0256954 A1 | 9/2015 | Carlsson et al. |
| 2015/0286360 A1 | 10/2015 | Wachter et al. |
| 2015/0304476 A1 | 10/2015 | Katada et al. |

FOREIGN PATENT DOCUMENTS

| | | |
|---|---|---|
| WO | 200153994 | 7/2001 |
| WO | 2003093950 A2 | 11/2003 |
| WO | 2004074999 A2 | 9/2004 |

OTHER PUBLICATIONS

AudioTron Quick Start Guide, Version 1.0, Mar. 2001, 24 pages.
AudioTron Reference Manual, Version 3.0, May 2002, 70 pages.
AudioTron Setup Guide, Version 3.0, May 2002, 38 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
Final Office Action dated Jun. 2, 2016, issued in connection with U.S. Appl. No. 14/042,160, filed Sep. 30, 2013, 10 pages.
Final Office Action dated Nov. 2, 2017, issued in connection with U.S. Appl. No. 14/042,160, filed Sep. 30, 2013, 14 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Non-Final Office Action dated Oct. 20, 2015, issued in connection with U.S. Appl. No. 14/042,160, filed Sep. 30, 2013, 10 pages.
Non-Final Office Action dated Mar. 24, 2017, issued in connection with U.S. Appl. No. 14/042,160, filed Sep. 30, 2013, 13 pages.
Non-Final Office Action dated Jun. 27, 2018, issued in connection with U.S. Appl. No. 14/042,160, filed Sep. 30, 2013, 12 pages.
Notice of Allowance dated Jan. 28, 2019, issued in connection with U.S. Appl. No. 14/042,160, filed Sep. 30, 2013, 21 pages.
Palm, Inc., "Handbook for the Palm VII Handheld," May 2000, 311 pages.
Presentations at WinHEC 2000, May 2000, 138 pages.
Sonos Digital Music System, User Guide, Version 090101, Sep. 2006.
U.S. Appl. No. 60/490,768, filed Jul. 28, 2003, entitled "Method for synchronizing audio playback between multiple networked devices," 13 pages.
U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
White R., "How Computers Work," Millenium Edition, Que Corporation, 1999.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.

* cited by examiner

DISCOVERY AND MEDIA CONTROL AT A POINT-OF-SALE DISPLAY

CROSS REFERENCE TO RELATED APPLICATIONS

This application claims priority under 35 U.S.C. § 120 to, and is a continuation of, U.S. non-provisional patent application Ser. No. 14/042,160, filed on Sep. 30, 2013, entitled "Personalized Media Playback at a Discovered Point-of-Sale Display," which is incorporated herein by reference in its entirety.

FIELD OF THE DISCLOSURE

The disclosure is related to consumer goods and, more particularly, to methods, systems, products, features, services, and other items directed to media playback or some aspect thereof.

BACKGROUND

Digital music has become readily available due in part to the development of consumer level technology that has allowed people to listen to digital music on a personal audio device. The consumer's increasing preference for digital audio has also resulted in the integration of personal audio devices into PDAs, cellular phones, and other mobile devices. The portability of these mobile devices has enabled people to take the music listening experience with them and outside of the home. People have become able to consume digital music, like digital music files or even Internet radio, in the home through the use of their computer or similar devices. Now there are many different ways to consume digital music, in addition to other digital content including digital video and photos, stimulated in many ways by high-speed Internet access at home, mobile broadband Internet access, and the consumer's hunger for digital media.

Until recently, options for accessing and listening to digital audio in an out-loud setting were severely limited. In 2005, Sonos offered for sale its first digital audio system that enabled people to, among many other things, access virtually unlimited sources of audio via one or more networked connected zone players, dynamically group or ungroup zone players upon command, wirelessly send the audio over a local network amongst zone players, and play the digital audio out loud across multiple zone players in synchrony. The Sonos system can be controlled by software applications running on network capable mobile devices and computers.

Like other electronic systems, the Sonos system is sold in retail stores. In the retail environment, point-of-sale (POS) displays are commonly used to draw a customer's attention toward a product. A POS display may demonstrate the capabilities of a product. However, such demonstrations may be generic in that one customer's experience with a POS display is the same as or similar to another customer's experience. Additionally, a POS display may be difficult to locate or a customer may not even know that a POS display is in the retail store. As a result, a customer may not have a satisfactory experience with a POS display and consequently, may not have a satisfactory experience with the product itself

BRIEF DESCRIPTION OF THE DRAWINGS

Features, aspects, and advantages of the presently disclosed technology may be better understood with regard to the following description, appended claims, and accompanying drawings where:

Figure 1:
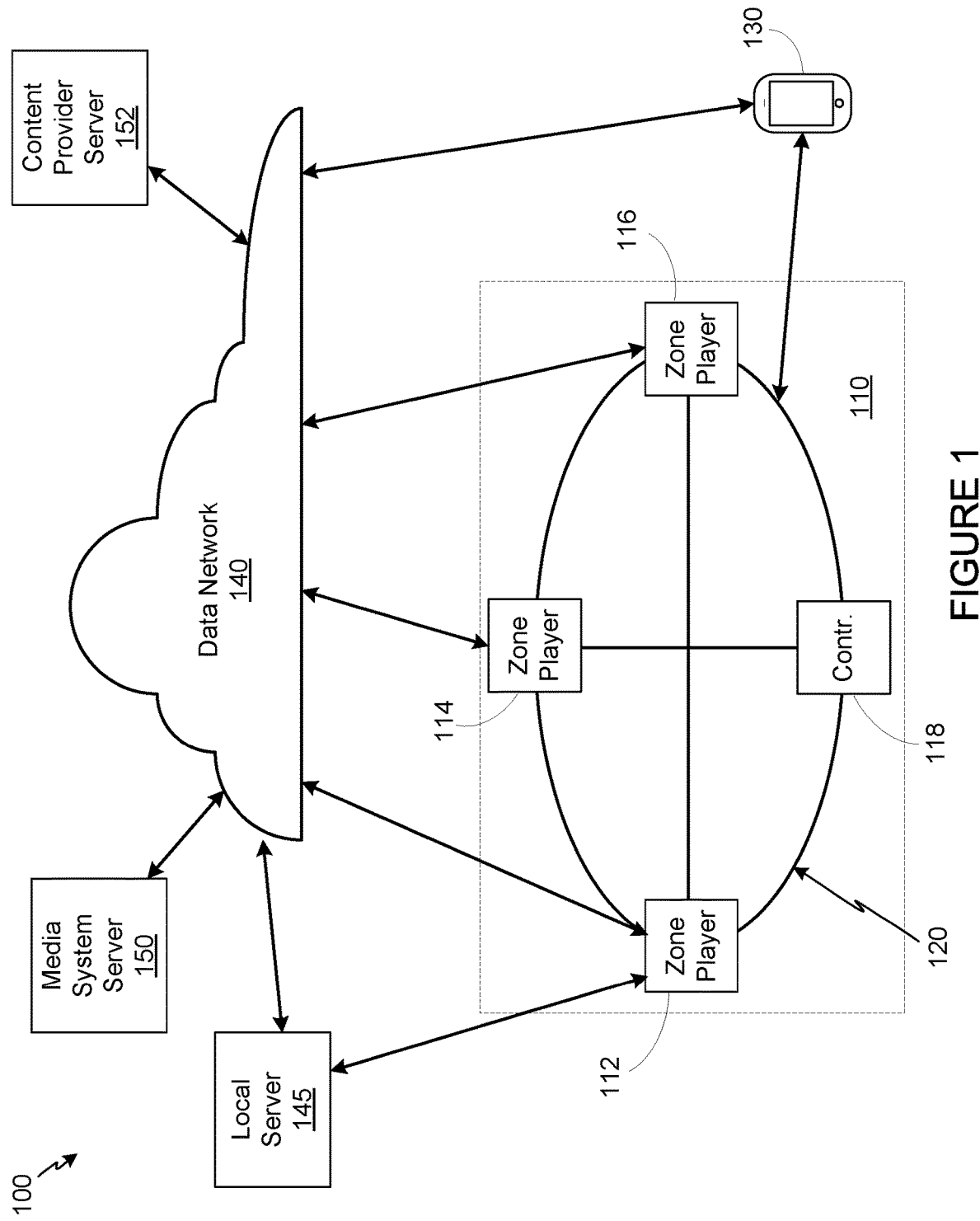
FIG. 1 shows an example system in which certain embodiments may be practiced.

In addition, the drawings are for the purpose of illustrating example embodiments, but it is understood that the inventions are not limited to the arrangements and instrumentality shown in the drawings.

DETAILED DESCRIPTION

I. Overview

Embodiments are described herein that may allow for the discovery of a point-of-sale (POS) display and the personalized playback of media at the discovered POS display. In certain embodiments, the POS display may include a media system that includes one or more playback devices. In some embodiments, the media system may also include one or more controllers. Further, the POS display may be connected to a data network. And a user may interact with the POS display via his/her portable computing device acting as a controller. In some embodiments, the portable computing device may be a smartphone or a tablet device.

In one embodiment, a user may discover the POS display via his/her portable computing device. For example, the user may receive a notification on his/her portable computing device. The notification may indicate a location of a POS display. The notification may also include a hyperlink to a software application, where the software application may be configured to control the media system of the POS display. In some instances, the user may discover the POS display by using his/her portable computing device to scan a barcode associated with the POS display. In some instances, the user may discover the POS display by sending a text message using his/her portable computing device to a recipient identified on the POS display (e.g., text "SONOS").

In some embodiments, the portable computing device may receive a software application and a system identifier of the POS display. The software application may be configured to control the media system of the POS display. The portable computing device may receive the software application and/or the system identifier from a server and/or the POS display. The system identifier may be used to automatically configure the software application to control the media system of the POS display. In an embodiment, the portable computing device may receive a notification with a hyperlink, and the user may click the hyperlink to receive the software application and the system identifier. In an embodiment, the portable computing device may receive a text or email with a hyperlink, and the user may click the hyperlink to receive the software application and the system identifier.

In another embodiment, the portable computing device may join the software application on the portable computing device to the POS display using the system identifier of the POS display. Joining the software application on the portable computing device to the POS display may cause the portable computing device to be able to control the POS display via the software application. In some embodiments, joining the software application on the portable computing device to the POS display may involve the portable computing device joining a playback network of the POS display.

In some embodiments, the portable computing device may send one or more commands via the software application to control the one or more playback devices at the POS display. For example, the one or more commands may cause the one or more playback devices to output audio content stored on a network personal computer. In other embodiments, the portable computing device may access audio content stored on a second portable computing device and cause the one or more playback devices to output the accessed audio content stored on the second portable computing device.

As suggested above, the present application allows for personalized playback of media at a point-of-sale display (POS display). In one aspect, a method is provided. The method involves discovering a point-of-sale display by a portable computing device. The point-of-sale display comprises at least one media playback device. The method further involves receiving, over a wireless network, by the portable computing device a software application and a system identifier of the point-of-sale display. The system identifier is to be used to automatically configure the software application to control the at least one media playback device at the discovered point-of-sale display. The method further involves joining the software application on the portable computing device to the point-of-sale display using the system identifier of the point-of-sale display. The method further involves sending from the portable computing device via the configured software application one or more commands to control the at least one media playback device.

In another aspect, a point-of-sale display system is provided. The point-of-sale display system includes a point-of-sale display. The point-of-sale display comprises at least one media playback device. The point-of-sale display further includes a wireless network and a portable computing device. The portable computing device is configured to discover the point-of-sale display. The portable computing device is further configured to receive, over the wireless network, a software application and a system identifier of the point-of-sale display. The system identifier is to be used to automatically configure the software application to control the at least one media playback device at the discovered point-of-sale display. The portable computing device is further configured to join the software application on the portable computing device to the point-of-sale display using the system identifier of the point-of-sale display. The portable computing device is further configured to send via the configured software application one or more commands to control the at least one media playback device.

In yet another aspect, a non-transitory computer readable medium is provided. The non-transitory computer readable medium has stored thereon instructions executable by at least one processor of a portable computing device to cause the portable computing device to perform functions. The instructions include instructions for discovering a point-of-sale display. The point-of-sale display comprises at least one media playback device. The instructions further include instructions for receiving, over a wireless network, a software application and a system identifier of the point-of-sale display. The system identifier is to be used to automatically configure the software application to control the at least one media playback device at the discovered point-of-sale display. The instructions further include instructions for joining the software application on the portable computing device to the point-of-sale display using the system identifier of the point-of-sale display. The instructions further include instructions for sending via the configured software application one or more commands to control the at least one media playback device. Other embodiments are provided and described herein.

II. Example Operating Environment

Referring now to the drawings, in which like numerals can refer to like parts throughout the figures, FIG. 1 shows an example system 100 that includes a point-of-sale-display (POS-display) in which one or more embodiments disclosed herein can be practiced or implemented. It is understood that the embodiments described herein are not limited for use with a POS display, but rather may be useful in a system where a connection between a playback media system and a portable computing device are made.

The example system 100 may include: a POS display 110, a portable computing device 130, a data network 140, a local server 145, a media system server 150, and a content provider server 152. The POS display 110 may include a media system that may include: zone players 112, 114, and 116, a controller 118, and a playback network 120. In other embodiments, the POS display may also include the local server 145. It should be understood that the example system 100 may include other POS displays, portable computing devices, controllers, media system servers, content provider servers, local servers, and data networks, and/or other network elements without departing from the present invention.

The portable computing device 130 may be a smartphone or a tablet device, among other portable computing devices. Some aspects of the portable computing device 130 will be discussed below with respect to controller 500 of FIG. 5. The zone players 112-116 are media playback devices that may provide audio, video, and/or audiovisual output. The zone players 112-116 may be configured in zones. For example, the zone players 112-114 may form a first zone, and the zone player 116 may form a second zone. Other zone configurations are certainly possible. The controller 118 is a device that may control the media system (e.g., the zone players 112-116 and/or other controllers). For example, the controller 118 may control zone configurations, among other configurations. The zone players 112-116 and the controller 118 may form the playback network 120 (as discussed further below). The playback network 120 may be an "ad-hoc" network or a "mesh" network, among other network types.

The POS display 110 may communicate with the portable computing device 130, the local server 145, the media system server 150, and the content provider server 152 via the data network 140. Further, the POS display 110 may communicate with the local server 145 directly. The portable computing device 130 may communicate with the local server 145, the POS display 110, the media system server 150, and the content provider server 152 via the data network 140. Additionally, the portable computing device 130 may communicate with the media system server 150 and the content provider server 152 indirectly via communicating with the POS display 110. The portable computing device 130 may communicate directly with the POS display 110. The zone players 112-116 and the controller 118 may use the playback network 120 to communicate with one another.

The example system 100 may be implemented, for example, in a retail store (e.g., having a POS display), a restaurant, or a coffee shop, among other public environments. In one embodiment, the data network 140 may include a public wireless network provided by a public entity. The POS display 110 may be a demonstration display where customers may interact with the media system of the POS display 110, for example, before purchasing a media system or individual devices (e.g., zone players or controllers). A customer may interact with the POS display 110 via his/her smartphone (e.g., the portable computing device 130). In another example, the POS display 110 may be part of an audio system that an environment provides to customers for their use and enjoyment. The example system 100 need not be implemented in a setting where the media system is for sale. Some aforementioned elements of the example system 100 are discussed in greater detail below.

a. Example Zone Players

Figure 2A:
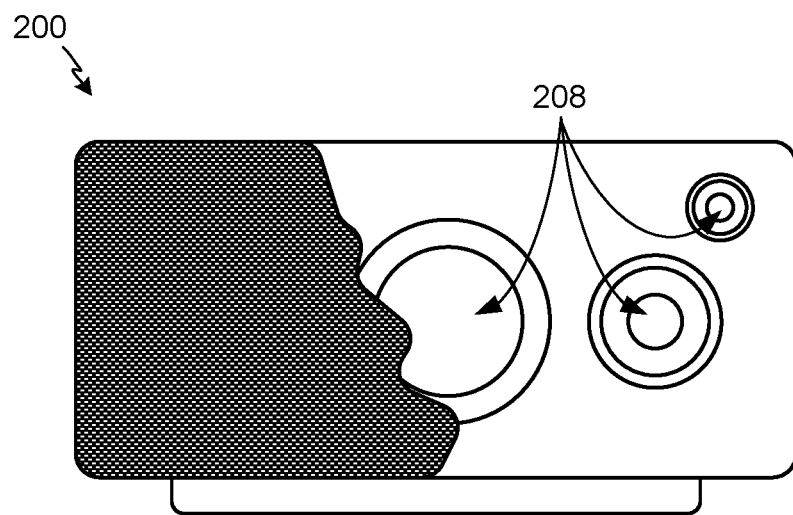
FIG. 2A shows an illustration of an example zone player having a built-in amplifier and transducers.
Figure 2B:
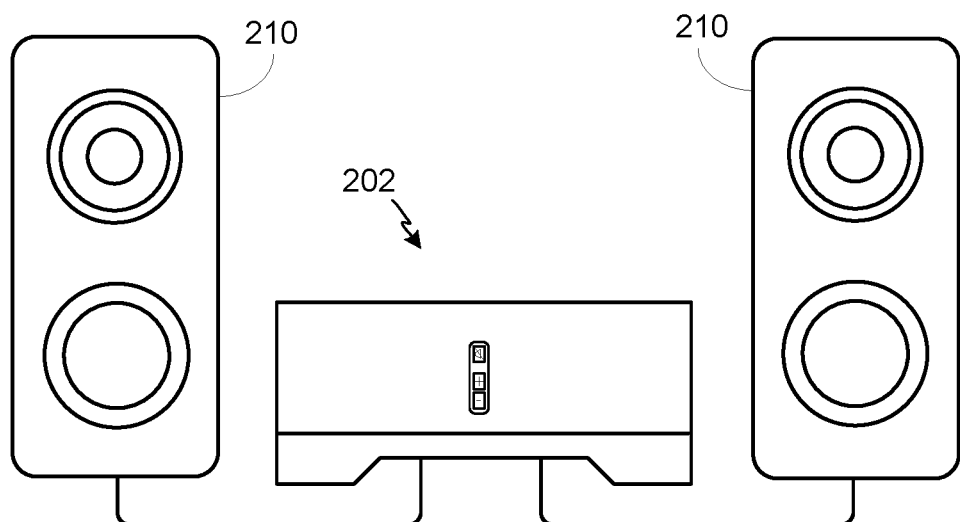
FIG. 2B shows an illustration of an example zone player having a built-in amplifier and connected to external speakers.
Figure 2C:
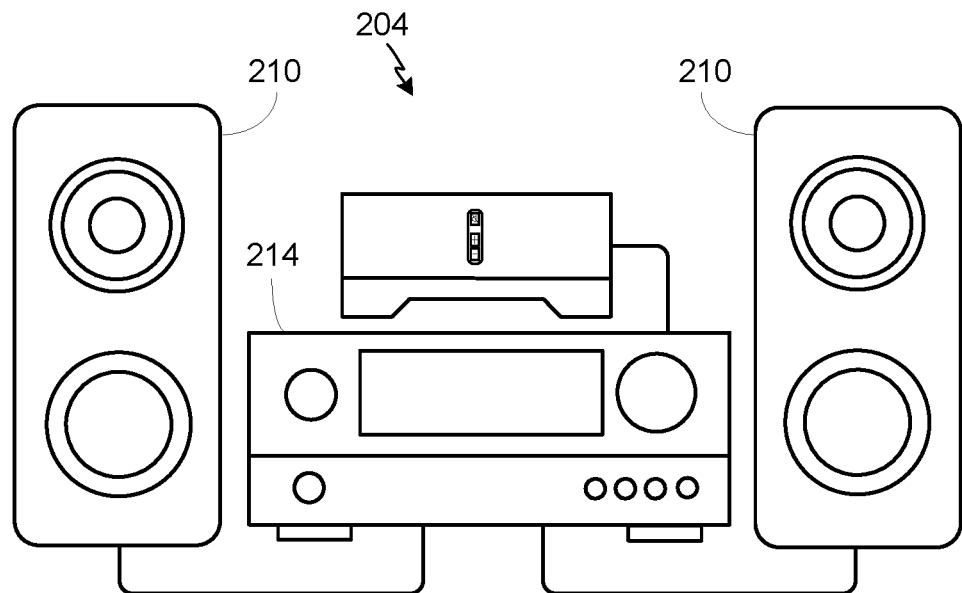
FIG. 2C shows an illustration of an example zone player connected to an A/V receiver and speakers.

FIGS. 2A, 2B, and 2C show example types of zone players. Zone players 200, 202, and 204 of FIGS. 2A, 2B, and 2C, respectively, can correspond to any of the zone players 112-116 of FIG. 1, for example. In some embodiments, audio is reproduced using only a single zone player, such as by a full-range player. In some embodiments, audio is reproduced using two or more zone players, such as by using a combination of full-range players or a combination of full-range and specialized players. In some embodiments, each zone player 200-204 may also be referred to as a "smart speaker," because each may contain processing capabilities beyond the reproduction of audio, more of which is described below.

FIG. 2A illustrates the zone player 200 that includes sound producing equipment 208 capable of reproducing full-range sound. The sound may come from an audio signal that is received and processed by the zone player 200 over a wired or wireless data network. The sound producing equipment 208 may include one or more built-in amplifiers and one or more acoustic transducers (e.g., speakers). A built-in amplifier is described more below with respect to FIG. 4. A speaker or acoustic transducer can include, for example, any of a tweeter, a mid-range driver, a low-range driver, and a subwoofer. In some embodiments, the zone player 200 can be statically or dynamically configured to play stereophonic audio, monaural audio, or both. In some embodiments, the zone player 200 may be dynamically configured to reproduce a subset of full-range sound, such as when the zone player 200 is grouped with other zone players to play stereophonic audio, monaural audio, and/or surround audio or when the media content received by the zone player 200 is less than full-range.

FIG. 2B illustrates the zone player 202 that includes a built-in amplifier to power a set of detached speakers 210. A detached speaker can include, for example, any type of loudspeaker. The zone player 202 may be configured to power one, two, or more separate loudspeakers. The zone player 202 may be configured to communicate an audio signal (e.g., right and left channel audio or more channels depending on its configuration) to the set of detached speakers 210 via a wired path.

FIG. 2C illustrates the zone player 204 that does not include a built-in amplifier, but is configured to communicate an audio signal, received over a data network, to an audio (or "audio/video") receiver 214 with built-in amplification.

Referring back to FIG. 1, in some embodiments, one, some, or all of the zone players 112-116 can retrieve audio directly from a source. For example, a particular zone player in a zone or zone group may be assigned to a playback queue (or "queue"). The playback queue may contain information corresponding to zero or more audio items for playback by the associated zone or zone group. The playback queue may be stored in memory on a zone player or some other designated device. Each item contained in the playback queue may comprise a uniform resource identifier (URI) or some other identifier that can be used by the zone player(s) to seek out and/or retrieve the audio items from the identified audio source(s). Depending on the item, the audio source might be found on the Internet (e.g., the cloud), locally from another device over the data network 140 (e.g., the portable computing device 130, described further below), from the controller 118, stored on the zone player itself, or from an audio source communicating directly to the zone player. In some embodiments, the zone player can reproduce the audio itself (e.g., play the audio), send the audio to another zone player for reproduction, or both where the audio is reproduced by the zone player as well as one or more additional zone players (possibly in synchrony). In some embodiments, the zone player may play a first audio content (or alternatively, may not play the content at all), while sending a second, different audio content to another zone player(s) for reproduction. To the user, each item in a playback queue may be represented on an interface of a controller by an element such as a track name, album name, radio station name, playlist, or other some other representation. A user can populate the playback queue with audio items of interest. The user may also modify and clear the playback queue, if so desired.

By way of illustration, SONOS, Inc. of Santa Barbara, Calif. presently offers for sale zone players referred to as a "PLAY:5," "PLAY:3," "PLAYBAR," "CONNECT:AMP," "CONNECT," and "SUB." Any other past, present, and/or future zone players can additionally or alternatively be used to implement the zone players of example embodiments disclosed herein.

Additionally, it is understood that a zone player is not limited to the particular examples illustrated in FIGS. 2A, 2B, and 2C or to the SONOS product offerings. For example, a zone player may include a wired or wireless headphone. In yet another example, a zone player might include a sound bar for television. In yet another example, a zone player may include or interact with a docking station for an Apple iPod™ or similar device.

b. Example Controllers

Figure 3:
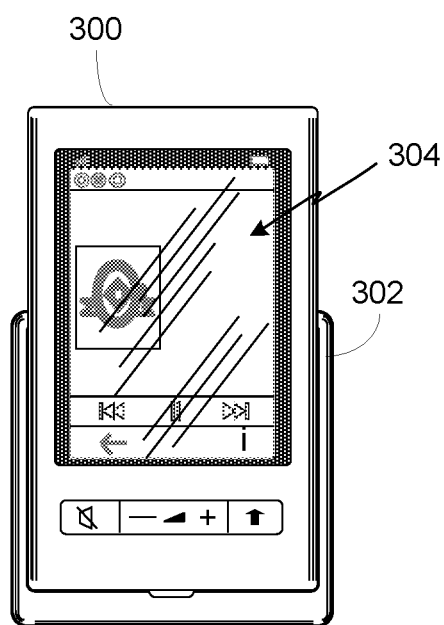
FIG. 3 shows an illustration of an example controller.

FIG. 3 illustrates an example wireless controller 300 in a docking station 302. By way of illustration, the controller 300 may correspond to the controller 118 of FIG. 1. The docking station 302, if provided or used, may provide power to the controller 300 and additionally may charge a battery of the controller 300. In some embodiments, the controller 300 may be provided with a touch screen 304 that allows a user to interact through touch with the controller 300, for example, to retrieve and navigate a playlist of audio items, modify and/or clear the playback queue of one or more zone players, control other operations of one or more zone players, and provide overall control of the media system of the POS display 110. In other embodiments, other input mechanisms such as voice control may be used to interact with the controller 300. In certain embodiments, any number of controllers can be used to control the media system of the POS display 110. In some embodiments, there may be a limit set on the number of controllers that can control the media system of the POS display 110. The controllers might be wireless like the wireless controller 300 or wired to the data network 140.

In some embodiments, if more than one controller is used in the media system of the POS display 110 of FIG. 1, each controller may be coordinated to display common content, and may all be dynamically updated to indicate changes made to the media system of the POS display 110 from a single controller. Coordination can occur, for instance, by a controller periodically requesting a state variable directly or indirectly from one or more of the zone players; the state variable may provide information about the media system of the POS display 110, such as current zone group configuration, what is playing in one or more zones, volume levels, and other items of interest. The state variable may be passed around on the data network 140 between zone players (and controllers, if so desired) as needed or as often as programmed.

In addition, a software application running on any portable computing device, such as an iPhone™, iPad™, Android™ powered phone or tablet, or any other smart phone or network-enabled device can be used as the controller 118 (e.g., the portable computing device 130). A software application running on a laptop or desktop personal computer (PC) or Mac™ can also be used as the controller 118. Such controllers may connect to the media system of the POS display 110 through an interface with the data network 140, a zone player, a wireless router, or using some other configured connection path. Example controllers offered by Sonos, Inc. of Santa Barbara, Calif. include a "Controller 200," "SONOS® CONTROL," "SONOS® Controller for iPhone™," "SONOS® Controller for iPad™," "SONOS® Controller for Android™," "SONOS® Controller for Mac™ or PC."

c. Example Data Connection

The zone players 112-116 of FIG. 1 may be coupled directly or indirectly to a data network, such as data network 140. The controller 118 may also be coupled directly or indirectly to the data network 140 or individual zone players. The data network 140 is represented by a cloud in FIG. 1. While the data network 140 is shown in a single location, it is understood that such a network is distributed in and around the POS display 110 and the portable computing device 130. Particularly, the data network 140 can be a wired network, a wireless network, or a combination of both wired and wireless networks. In some embodiments, one or more of the zone players 112-116 may be wirelessly coupled to the data network 140 based on a proprietary mesh network. In some embodiments, one or more of the zone players may be coupled to the data network 140 using a centralized access point such as a wired or wireless router. In some embodiments, one or more of the zone players 112-116 may be coupled via a wire to the data network 140 using Ethernet or similar technology. In addition to the one or more zone players 112-116 connecting to the data network 140, the data network 140 can further allow access to a wide area network, such as the Internet.

In some embodiments, connecting any of the zone players 112-116, or some other connecting device, to a broadband router, may create the data network 140. Other of the zone players 112-116 may then be added wired or wirelessly to the data network 140. For example, a zone player (e.g., any of the zone players 112-116) can be added to the media system of the POS display 110 by simply pressing a button on the zone player itself (or perform some other action), which enables a connection to be made to the data network 140. The broadband router can be connected to an Internet Service Provider (ISP), for example. The broadband router can be used to form another data network within the example system 100, which can be used in other applications (e.g., web surfing). The data network 140 can also be used in other applications, if so programmed. An example second network may implement SONOSNET™ protocol, developed by SONOS, Inc. of Santa Barbara. SONOSNET™ represents a secure, AES-encrypted, peer-to-peer wireless mesh network. Alternatively, in certain embodiments, the data network 140 is the same network, such as a traditional wired or wireless network, used for other applications in a retail or coffee shop environment, for example.

d. Example Zone Configurations

A particular zone may contain one or more zone players. For example, referring back to FIG. 1, a first zone may contain the zone player 112 and a second zone may contain the zone players 114-116. In some embodiments, a zone player may be assigned to a new or existing zone via the controller 118 (or the computing device 130). As such, zones may be created, combined with another zone, removed, and given a specific name (e.g., "Point-of-Sale Display Zone") if so desired and programmed to do so with the controller 118 (or the computing device 130). Moreover, in some embodiments, zone configurations may be dynamically changed even after being configured using the controller 118 (or the computing device 130) or some other mechanism.

In some embodiments, a "bonded zone" contains two or more zone players, such as the zone players 112 and 116, whereby the zone players 112 and 116 may be configured to play the same audio source in synchrony. In one example, the zone players 112 and 116 may be paired to play two separate sounds in left and right channels, for example. In other words, the stereo effects of a sound can be reproduced or enhanced through the two zone players 112 and 116, one for the left sound and the other for the right sound. In another example two or more zone players can be sonically consolidated to form a single, consolidated zone player. A consolidated zone player (though made up of multiple, separate devices) can be configured to process and reproduce sound differently than an unconsolidated zone player or zone players that are paired, because a consolidated zone player has additional speaker drivers from which sound can be passed. The consolidated zone player can further be paired with a single zone player or yet another consolidated zone player. Each playback device of a consolidated playback device can be set in a consolidated mode, for example.

In certain embodiments, paired or consolidated zone players (also referred to as "bonded zone players") can play audio in synchrony with other zone players in the same or different zones.

According to some embodiments, one can continue to do any of: group, consolidate, and pair zone players, for example, until a desired configuration is complete. The actions of grouping, consolidation, and pairing are preferably performed through a control interface, such as using the controller 118 or the computing device 130, and not by physically connecting and re-connecting speaker wire, for example, to individual, discrete speakers to create different configurations. As such, certain embodiments described herein provide a more flexible and dynamic platform through which sound reproduction can be offered to the end-user.

e. Example Audio Sources

In some embodiments, each zone can play from the same audio source as another zone or each zone can play from a different audio source. For example, the zone players 112-116 may each belong to a separate zone, i.e., three zones may exist where each zone includes one zone player. Someone may listen to jazz music via the zone player 112, while someone else may listen to classical music via the zone player 116. Further, a third person may listen to the same jazz music via the zone player 114 that is playing on the zone player 112. In some embodiments, the jazz music played via the zone players 112 and 114 may be played in synchrony. Synchronizing playback amongst zones allows for an individual to pass through zones while seamlessly (or substantially seamlessly) listening to the audio. Such a configuration may be referred to as a synchrony group. Further, zones may be put into a "party mode" such that all associated zones will play audio in synchrony.

Sources of audio content that may be played by the zone players 112-116 are numerous. In some embodiments, audio on a zone player itself may be accessed and played. In some embodiments, audio on a controller may be accessed via the data network 140 and played. In some embodiments, music from a personal library stored on a computer or networked-attached storage (NAS) may be accessed via the data network 140 and played. In other embodiments, music from a smartphone (e.g., the computing device 130) may be accessed and played. In some embodiments, Internet radio stations, shows, and podcasts may be accessed via the data network 140 and played (e.g., via the content provider server 152). Music or cloud services that let a user stream and/or download music and audio content may be accessed via the data network 140 and played (e.g., via the content provider server 152). Further, music may be obtained from traditional sources, such as a turntable or CD player, via a line-in connection to a zone player, for example. Audio content may also be accessed using a different protocol, such as Airplay™ which is a wireless technology by Apple, Inc., for example. Audio content received from one or more sources can be shared amongst the zone players 112-116 via the data network 140 and/or the controller 118 or the portable computing device 130. The above-disclosed sources of audio content are referred to herein as network-based audio information sources. However, network-based audio information sources are not limited thereto.

In some embodiments, the zone players 112-114 may be coupled to an audio information source such as a television. In some examples, the television may be used as a source of audio for the zone player 112-114, while in other examples audio information from the television may be shared with any of the zone players 112-116 in the media system of the POS display 110.

e. Example Servers

In some embodiments, one or more of the zone players 112-116, the controller 118, and/or the portable computing device 130 may communicate with the local server 145, the media system server 150, and/or the content provider server 152. Each of the servers may include at least one processor, memory, and a network interface, among other components. The network interface may facilitate data flow between a server and another network device via the data network 140. Further, the various servers may communicate with one another via the data network 140.

In one embodiment, the local server 145 may be associated with an environment (e.g., a retail store or a coffee shop), and the local server 145 may store in memory data particular to the associated environment. For example, the local server 145 may store account data, POS data, and/or POS-location data, among other data. The account data may indicate one or more content provider subscriptions that the environment may receive media streams/downloads from. For example, a retail store may have a streaming media account (e.g., a Pandora® Internet Radio or Spotify ® account), and the account data may indicate account login information and/or passwords used to obtain these services. The content provider server 152 may transmit these services to the local server 145. The POS data may indicate one or more POS displays that the environment is currently displaying and the products and/or brands of each POS display. The POS-location data may indicate locations of each POS display within the environment. For example, the POS-location data may indicate that a SONOS POS display is located somewhere along aisle 23. In some embodiments, the local server 145 may store in memory a software application that may be used to control a media system of a POS display.

In certain embodiments, the media system server 150 may be associated with a POS display and/or a provider of products associated with a group of POS displays. For example, the media system server 150 may be associated with the POS display 110 and other POS displays that display the same or related products as the POS display 110. The media system server 150 may store in memory POS-location data, which may indicate where particular POS displays are located. In some embodiments, the POS-location data may include GPS coordinates and/or geo-location data. Other location data types are also possible.

In some embodiments, the media system server 150 may store in memory a software application that may be downloaded over a data network (e.g., the data network 140) by a portable computing device (e.g., the portable computing device 130). The software application may be used to control a media system of a POS display (e.g., the media system of the POS display 110). In other embodiments, the media system server 150 may store in memory system identifiers associated with POS-display media systems. The system identifiers may indicate one or more configuration variables that may allow a device to connect to a network of a POS-display. For example, the system identifiers may indicate individual media playback devices of a POS-display that the device may connect with. Other example system identifiers are also possible.

In other embodiments, the content provider server 152 may store in memory media content that the content provider server 152 may transmit to other devices via the data network 140. The content provider server 152 may provide streaming media content and/or downloadable media content. For example, the content provider server 152 may provide Internet radio stations, shows, podcasts, and/or music or cloud services that allow a user stream and/or download music and/or audio content. Other example content may also be provided. The content provider server 152 may also store in memory account data of registered subscribers. The account data may indicate account login information and/or passwords used by the subscribers to obtain services from the content provider server 152.

III. Example Zone Players

Figure 4:
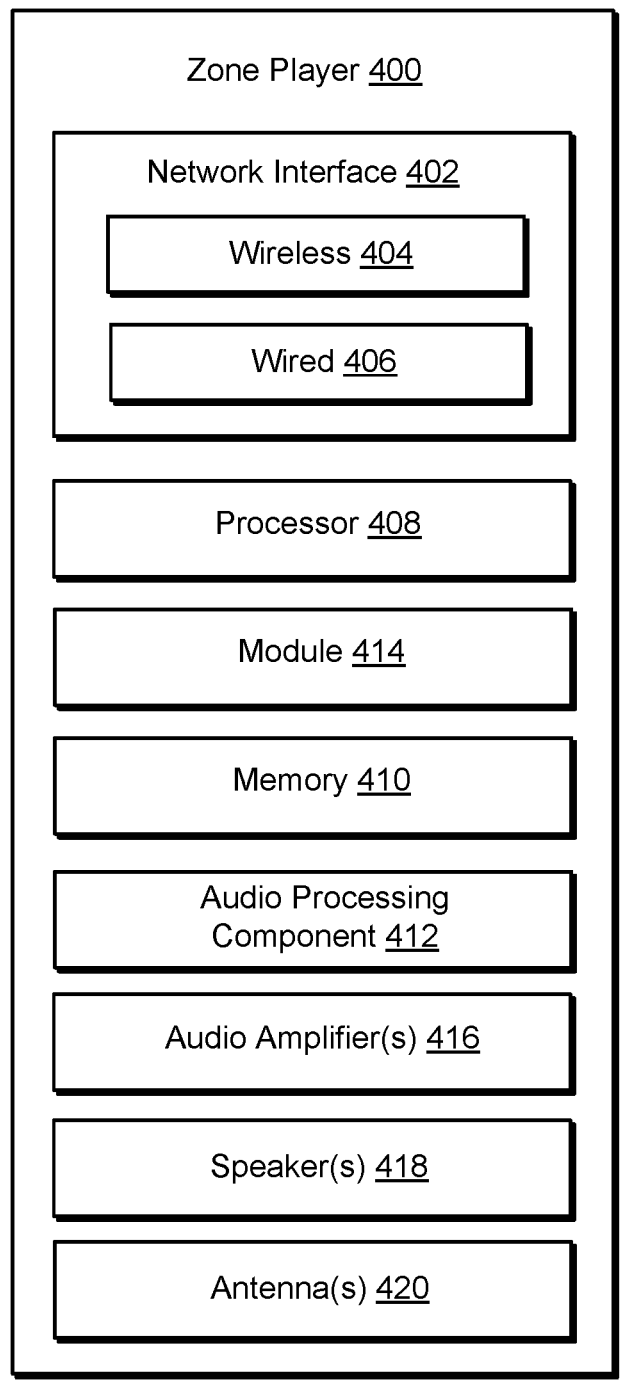
FIG. 4 shows an internal functional block diagram of an example zone player.

Referring now to FIG. 4, there is shown an example block diagram of a zone player 400 in accordance with an embodiment. The zone player 400 may include a network interface 402, a processor 408, a memory 410, an audio processing component 412, one or more software modules 414, an audio amplifier 416, and a speaker unit 418 coupled to the audio amplifier 416. FIG. 2A shows an example illustration of such a zone player. Other types of zone players may not include the speaker unit 418 (e.g., such as shown in FIG. 2B) or the audio amplifier 416 (e.g., such as shown in FIG. 2C). Further, it is contemplated that the zone player 400 can be integrated into another component. For example, the zone player 400 could be constructed as part of a television, lighting, or some other device for indoor or outdoor use.

In some embodiments, the network interface 402 facilitates a data flow between the zone player 400 and other devices on the data network 140. In some embodiments, in addition to getting audio from another zone player or device on the data network 140, the zone player 400 may access audio directly from the audio source, such as over a wide area network or on the local network. In some embodiments, the network interface 402 can further handle the address part of each packet so that it gets to the right destination or intercepts packets destined for the zone player 400. Accordingly, in certain embodiments, each of the packets includes an Internet Protocol (IP)-based source address as well as an IP-based destination address.

In some embodiments, the network interface 402 can include one or both of a wireless interface 404 and a wired interface 406. The wireless interface 404, also referred to as a radio frequency (RF) interface, provides network interface functions for the zone player 400 to wirelessly communicate with other devices (e.g., other zone player(s), speaker(s), receiver(s), component(s) associated with the data network 140, and so on) in accordance with a communication protocol (e.g., any wireless standard including IEEE 802.11a, 802.11b, 802.11g, 802.11n, 802.11ac, 802.15, 4G mobile communication standard, and so on). The wireless interface 404 may include one or more radios. To receive wireless signals and to provide the wireless signals to the wireless interface 404 and to transmit wireless signals, the zone player 400 includes one or more antennas 420. The wired interface 406 provides network interface functions for the zone player 400 to communicate over a wire with other devices in accordance with a communication protocol (e.g., IEEE 802.3). In some embodiments, a zone player may include multiple wireless 404 interfaces. In some embodiments, a zone player may include multiple wired 406 interfaces. In some embodiments, a zone player may include both of the interfaces 404 and 406. In some embodiments, a zone player may include only the wireless interface 404 or the wired interface 406.

In some embodiments, the processor 408 is a clock-driven electronic device that is configured to process input data according to instructions stored in the memory 410. The memory 410 is data storage that can be loaded with the one or more software modules 414, which can be executed by the processor 408 to achieve certain tasks. In the illustrated embodiment, the memory 410 is a tangible machine-readable medium storing instructions that can be executed by the processor 408. In some embodiments, a task might be for the zone player 400 to retrieve audio data from another zone player or a device, such as the computing device 130, on a network (e.g., using a uniform resource locator (URL) or some other identifier). In some embodiments, a task may be for the zone player 400 to send audio data to another zone player or device (e.g., the computing device 130) on a network. In some embodiments, a task may be for the zone player 400 to synchronize playback of audio with one or more additional zone players. In some embodiments, a task may be to pair the zone player 400 with one or more zone players to create a multi-channel audio environment. Additional or alternative tasks can be achieved via the one or more software modules 414 and the processor 408.

The audio processing component 412 can include one or more digital-to-analog converters (DAC), an audio preprocessing component, an audio enhancement component or a digital signal processor, and so on. In some embodiments, the audio processing component 412 may be part of the processor 408. In some embodiments, the audio that is retrieved via the network interface 402 may be processed and/or intentionally altered by the audio processing component 412. Further, the audio processing component 412 can produce analog audio signals. The processed analog audio signals may then be provided to the audio amplifier 416 for playback through the speaker unit 418. In addition, the audio processing component 412 can include circuitry to process analog or digital signals as inputs to play from the zone player 400, send to another zone player on a network, or both play and send to another zone player on the network. An example input includes a line-in connection (e.g., an auto-detecting 3.5 mm audio line-in connection).

The audio amplifier 416 is a device(s) that amplifies audio signals to a level for driving one or more speakers of the speaker unit 418. The one or more speakers 418 can include an individual transducer (e.g., a "driver") or a complete speaker system that includes an enclosure including one or more drivers. A particular driver can be a subwoofer (e.g., for low frequencies), a mid-range driver (e.g., for middle frequencies), and a tweeter (e.g., for high frequencies), for example. An enclosure can be sealed or ported, for example. Each transducer may be driven by its own individual amplifier.

A commercial example, presently known as the PLAY:5™, is a zone player with a built-in amplifier and speakers that is capable of retrieving audio directly from the source, such as on the Internet or on the local network, for example. In particular, the PLAY:5™ is a five-amp, five-driver speaker system that includes two tweeters, two mid-range drivers, and one woofer. When playing audio content via the PLAY:5, the left audio data of a track is sent out of the left tweeter and left mid-range driver, the right audio data of a track is sent out of the right tweeter and the right mid-range driver, and mono bass is sent out of the subwoofer. Further, both mid-range drivers and both tweeters have the same equalization (or substantially the same equalization). That is, they are both sent the same frequencies but from different channels of audio. Audio from Internet radio stations, online music and video services, downloaded music, analog audio inputs, television, DVD, and so on, can be played from the PLAY:5™

IV. Example Controller

Figure 5:
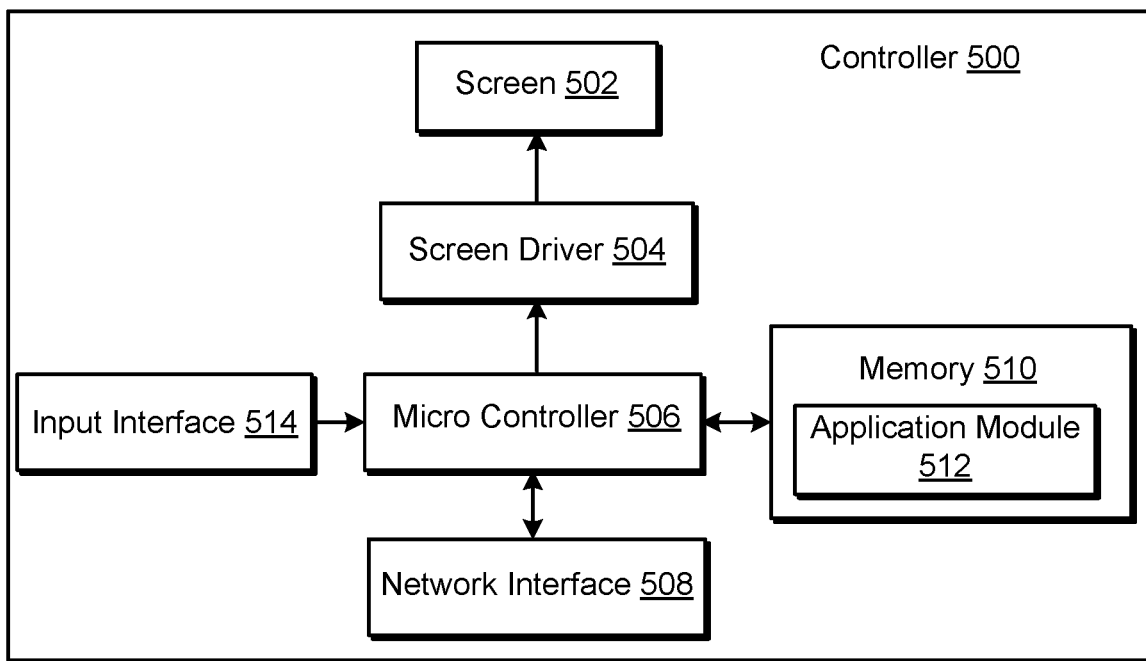
FIG. 5 shows an internal functional block diagram of an example controller.

Referring now to FIG. 5, there is shown an example block diagram for a controller 500, which can correspond to the controller 118 in FIG. 1. The controller 500 can be used to facilitate the control of multi-media applications, automation and others in a system. In particular, the controller 500 may be configured to facilitate a selection of a plurality of audio sources available on the data network 140 and enable control of one or more zone players (e.g., the zone players 112-116 in FIG. 1) through a wireless or wired network interface 508. According to one embodiment, the wireless communications may be based on an industry standard (e.g., infrared, radio, wireless standards including IEEE 802.11a, 802.11b, 802.11g, 802.11n, 802.11ac, 802.15, 4G mobile communication standard, and so on). Further, when a particular audio is being accessed via the controller 500 or being played via a zone player, a picture (e.g., album art) or any other data, associated with the audio and/or audio source can be transmitted from a zone player or other electronic device to the controller 500 for display.

The controller 500 may be provided with a screen 502 and an input interface 514 that may allow a user to interact with the controller 500, for example, to navigate a playlist of many multimedia items and to control operations of one or more zone players. The screen 502 on the controller 500 can be an LCD screen, for example. The screen 500 communicates with and is commanded by a screen driver 504 that is controlled by a microcontroller (e.g., a processor) 506. The controller memory 510 can be loaded with one or more application modules 512 that can be executed by the microcontroller 506 with or without a user input via the user interface 514 to achieve certain tasks. In some embodiments, the application module 512 may be configured to facilitate grouping a number of selected zone players into a zone group to facilitate synchronized playback amongst the zone players in the zone group. In some embodiments, the application module 512 may be configured to control the audio sounds (e.g., volume) of the zone players in a zone group. In operation, when the microcontroller 506 executes one or more of the application modules 512, the screen driver 504 may generate control signals to drive the screen 502 to display an application specific user interface accordingly.

The controller 500 includes a network interface 508 that may facilitate wired or wireless communication with a zone player. In some embodiments, the commands such as volume control and audio playback synchronization may be sent via the network interface 508. In some embodiments, a saved zone group configuration may be transmitted between a zone player and a controller via the network interface 508. The controller 500 can control one or more zone players, such as the zone players 112-116 of FIG. 1. There can be more than one controller for a particular system, and each controller may share common information with another controller, or retrieve the common information from a zone player, if such a zone player stores configuration data (e.g., such as a state variable). Further, a controller can be integrated into a zone player.

It should be noted that other network-enabled devices such as an iPhone™, iPad™ or any other smartphone (e.g., the portable computing device 130) or network-enabled device (e.g., a networked computer such as a PC or Mac™) can also be used as a controller to interact or control zone players in a particular environment. In some embodiments, a software application or upgrade can be downloaded onto a network-enabled device to perform the functions described herein. It should be understood that the portable computing device 130 described earlier in connection with FIG. 1 may include all or some of the same components as the controller 500. Further, it should be understood that the portable computing device 130 may be configured to perform all or some of the same operations as the controller 500. For example, the portable computing device 130 may be configured to facilitate a selection of a number of audio sources available on the data network 140 and enable control of one or more of the zone players 112-116.

In certain embodiments, a user can create a zone group (also referred to as a bonded zone) including at least two zone players from the controller 500. The zone players in the zone group can play audio in a synchronized fashion, such that all of the zone players in the zone group playback an identical audio source or a list of identical audio sources in a synchronized manner such that no (or substantially no) audible delays or hiccups are to be heard. Similarly, in some embodiments, when a user increases the audio volume of the group from the controller 500, the signals or data of increasing the audio volume for the group are sent to one of the zone players and causes other zone players in the group to be increased together in volume.

A user via the controller 500 can group zone players into a zone group by activating a "Link Zones" or "Add Zone" soft button, or de-grouping a zone group by activating an "Unlink Zones" or "Drop Zone" button. For example, one mechanism for 'joining' zone players together for audio playback is to link a number of zone players together to form a group. To link a number of zone players together, a user can manually link each zone player or zone one after the other. For example, assume that there is a multi-zone system that includes six zones, each including at least one zone player. In certain embodiments, a user can link any number of the six zone players, for example, by starting with a single zone and then manually linking each zone to that zone.

In certain embodiments, a set of zones can be dynamically linked together using a command to create a zone scene or theme (subsequent to first creating the zone scene). For instance, a "Retail Store Opens" zone scene command can link multiple zones together in one action. Without this single command, the user would manually and individually link each zone. The single command may include a mouse click, a double mouse click, a button press, a gesture, or some other programmed or learned action. Other kinds of zone scenes can be programmed or learned by the system over time.

In certain embodiments, a zone scene can be triggered based on time (e.g., an alarm clock function). For instance, a zone scene can be set to apply at 8:00 am. The system can link appropriate zones automatically, set specific music to play, and then stop the music after a defined duration and revert the zones to their prior configuration. Although any particular zone can be triggered to an "On" or "Off" state based on time, for example, a zone scene enables any zone(s) linked to the scene to play a predefined audio (e.g., a favorable song, a predefined playlist) at a specific time and/or for a specific duration. If, for any reason, the scheduled music failed to be played (e.g., an empty playlist, no connection to a share, failed Universal Plug and Play (UPnP), no Internet connection for an Internet Radio station, and so on), a backup buzzer can be programmed to sound. The buzzer can include a sound file that is stored in a zone player, for example.

V. Example Playback Network

Particular examples are now provided in connection with the POS display 110 of FIG. 1 to describe, for purposes of illustration, certain embodiments to provide and facilitate connection to the media system of the POS display 110. FIG. 1 shows that there are three zone players 112, 114 and 116 and a controller 118 that form a network branch that is also referred to as the playback network 120. The playback network 120 may be wireless, wired, or a combination of wired and wireless technologies. The playback network 120 may be an "ad-hoc" network. In general, an "ad-hoc" (or "spontaneous") network is a local area network or other small network in which there is generally no one access point for all traffic. With the established playback network 120, the devices 112-118 can all communicate with each other in a "peer-to-peer" style of communication, for example. Furthermore, devices (e.g., the portable computing device 130) may join and/or leave from the playback network 120, and the playback network 120 will automatically reconfigure itself without needing the user to reconfigure the playback network 120. While an ad-hoc network is discussed, it is understood that the playback network 120 may be based on a type of network that is completely or partially different from an ad-hoc network.

Using the playback network 120, the devices 112-118 can share or exchange one or more audio sources and be dynamically grouped (or ungrouped) to play the same or different audio sources. For example, the zone players 112 and 114 may be grouped to playback one piece of music, and at the same time, the zone player 116 may playback another piece of music. In other words, the devices 112-118, as shown in FIG. 1, form a GROUPING that distributes audio and/or reproduces sound. As used herein, the term GROUPING is used to represent a collection of networked devices that are cooperating to provide an application or service. playback In certain embodiments, a GROUPING identifier (GID) is a short string or an identifier that is computer-generated to help ensure that it is unique. Accordingly, the layback network 120 can be characterized by a unique GID and a unique set of configuration variables or parameters, such as channels (e.g., respective frequency bands), a service set identifier (SSID) (a sequence of alphanumeric characters as a name of a wireless network), and WEP keys (wired equivalent privacy) or other security keys. In certain embodiments, a SSID is set to be the same as the GID.

In certain embodiments, each GROUPING may include two types of network nodes: a control point (CP) and a zone player (ZP). The CP controls an overall network setup process and sequencing, including an automatic generation of required network parameters (e.g., security keys). In an embodiment, the CP also provides the user with a GROUPING configuration user interface. The CP function can be provided by a computer running a CP application module, or by a handheld controller (e.g., the controller 300) also running a CP application module, for example. The ZP is any other device on the network that is placed to participate in the automatic configuration process. In certain embodiments, the ZP, as a notation used herein, may include the controller 300 or a computing device, for example. In some embodiments, the functionality, or certain parts of the functionality, in both the CP and the ZP may be combined at a single node (e.g., a ZP contains a CP or vice-versa).

In certain embodiments, a GROUPING configuration may involve multiple CPs and ZPs that rendezvous and establish a known configuration such that they can use a standard networking protocol (e.g., IP over Wired or Wireless Ethernet) for communication. In an embodiment, two types of networks/protocols may be employed: Ethernet 802.3 and Wireless 802.11g. Interconnections between a CP and a ZP can use either of the networks/protocols. A device in the system as a member of a GROUPING can connect to both networks simultaneously.

In an environment that has both networks in use, it is assumed that at least one device in a system is connected to both as a bridging device, thus providing bridging services between wired/wireless networks for others. The zone player 112 in FIG. 1 could be connected to both networks, for example. The connectivity to the networks may be based on Ethernet and/or Wireless, while the connectivity to other devices 114-118 may be based on Wireless and Ethernet if so desired.

It is understood, however, that in some embodiments each zone player 112-116 may access the Internet when retrieving media from the cloud (e.g., the Internet) via the bridging device. For example, the zone player 112 may contain a uniform resource locator (URL) that specifies an address to a particular audio track in the cloud. Using the URL, the zone player 112 may retrieve the audio track from the cloud, and ultimately play the audio out of one or more of the other zone players.

In some embodiments, a device (e.g., the computing device 130) may join an established GROUPING. For example, in reference to FIG. 1, the media system of the POS display 110 may constitute a GROUPING formed by GROUPING members: the zone players 112-116 and the controller 118. The portable computing device 130 may include a software application that may be configured to control the GROUPING. The software application on the portable computing device 130 may join the POS display 110 (e.g., the portable computing device 130 may join the GROUPING formed by the media system of the POS display) according to the example procedures discussed below.

The device may receive a command to join the GROUPING (e.g., from a user input). Upon receiving a command to join the device (e.g., the portable computing device 130) to the GROUPING, the device may execute an embedded module that may be configured to establish a communication path with a member device (e.g., any of the zone players 112-116 or the controller 118). The communication path may facilitate an automatic configuration of the device via the member device. This communication path may operate over wireless and/or wired (e.g., Ethernet) protocols. In operation, the communication path does not cause negative effects on other devices in the vicinity and may reach all other members of the GROUPING, if there are any. It should also be noted that the communication path does not have to be direct between the device and the member device. It may be bridged by one or more other devices. Because the communication path is only used for initial device configuration, it does not require significant performance or sophisticated functionality. There are at least two elements to establish the communication path: channel selection and packet exchange.

Generally speaking, the selection of an appropriate (RF) transmission channel or simply channel is primarily an exercise in two constraints: finding a channel that is quiet from a protocol (e.g., 802.11) viewpoint, i.e., minimal conflicting wireless traffic, and finding a channel that is quiet from an RF viewpoint, i.e., minimal noise from other signals. Both of these tests may be applied because typically a coffee shop/retail environment may have other RF (e.g., 2.4 GHz) traffic or potentially other wireless access points. It is generally desirable to use a channel that is free from other RF interference. In any case, it is always desirable to avoid other wireless traffic.

Channel selection may be accomplished with a scanning technique, namely the device (e.g., the computing device 130) may listen on each channel for a period of time, looking for the presence of wireless beacons and other RF signals. In one embodiment, member devices that are configured (e.g., the zone players 112-116 and the controller 118) may have a preferred channel for the GROUPING, while the device (e.g., the portable computing device 130 and other devices that are not configured) may have a pre-defined (default) channel or channels that they rendezvous on. For example, 802.11 b/g channel 1 could be pre-configured as the default channel. Alternatively, multiple channels, with a well-known frequency hopping sequence, could be used by the device (this would require an aperiodic frequency change interval).

Many hardware configurations may only support reception/transmission on a single channel at a given time. Also there are configured and non-configured devices that may use different channels for the bootstrap configuration and standard network operations (post-configuration communications). According to one embodiment, it may be necessary to forcibly put the device (e.g., the portable computing device 130) in a "configuration" mode, whereby the device uses the appropriate channels for communication.

To enable communication between devices that are not part of the GROUPING, a packet exchange network infrastructure may be developed. Probing messages may be sent in over wireless and/or Ethernet networks, reaching any connected devices. Devices that are already in the GROUP- ING (e.g., the zone players 112-116 and the controller 118) constitute a network infrastructure that may be used to exchange unicast and multicast/broadcast network frames between the devices. The portable computing device 130, or any other device that is not yet a member of the GROUPING may have more limited networking capability and may, for example, only receive data from devices to which it is directly connected to and unencrypted messages broadcast to all wireless networks operating in a particular channel of the RF spectrum.

In general, an IP address of the portable computing device 130, or another device that wishes to join the GROUPING, may not be known to any members of the GROUPING. In some instances, the portable computing device 130 may not have an IP address at all, or it may have an automatically assigned IP address that is inaccessible to other devices with IP addresses respectively assigned by a DHCP server. To allow the portable computing device 130 and other devices that are not members of the GROUPING to join the GROUPING, a transport may be constructed that may get data one "hop" beyond the GROUPING network infrastructure.

In one embodiment, packets of data may be broadcast among the member devices of the GROUPING. The packets of data may comprise a mixture of "probe" datagrams and standard IP broadcast. For example, the 802.11 "probe" datagrams are used for the inherent ability to cross wireless network boundaries. In other words, the "probe" datagrams may be received by all listeners (e.g., the portable computing device 130) on the channel, even those that are not configured with an SSID, because they are sent to the broadcast BSS (e.g., FF:FF:FF:FF:FF:FF) to which all devices may be configured to listen. A standard IP broadcast may be used on the GROUPING network infrastructure to enable a PC-based controller to participate while running with standard user privileges (which allow access only to IP-based network services). Used together as described below, the combination of the "probe" datagrams and IP broadcast provides for a broadcast datagram transport that allows even devices that have not had any networking parameters configured to communicate.

In general, the probe datagrams may comprise a number of elements to facilitate the configuration of other devices (e.g., the portable computing device 130) to join the GROUPING. In one embodiment, each of the elements may carry up to 255 bytes of data. An element may contain data payload for each message used by the bootstrap procedure to invite others to join the GROUPING. This element may be repeated as many times as necessary to carry the complete message. In one embodiment, the IP broadcast datagram may contain the same data payload as the normal IP data payload.

Messages relating to the bootstrap procedure may be forwarded beyond the boundaries of the existing GROUPING network infrastructure (e.g., the playback network 120). Similarly, messages originating outside of the GROUPING network infrastructure may be forwarded into the infrastructure. This forwarding procedure may be accomplished in a mixed wireless/wired network environment without introducing a broadcast storm. A broadcast storm is a state in which a message that has been broadcast across a network results in more responses than necessary, and each response results in even more responses in a snowball effect, subsequently resulting in a network meltdown. In one embodiment, the network may be configured to prevent such a broadcast storm or any illegal broadcast messages. To accomplish this, two flags may be included in the message body, for example, "SENT_AS_PROBE" and "SENT_AS_IP BROADCAST". When a member device receives a "probe" message, assumed using "Sonos Netstart" SSID (or the broadcast BSS, as with all probe requests), it may forward the message as an IP broadcast message (after setting the "SENT AS_IP BROADCAST" flag) if the SENT AS_IP BROADCAST flag is not already set. Similarly, when a member device receives an IP broadcast with a UDP payload address to an appropriate port (e.g., port number 6969), it may forward the message as a "probe" datagram (after setting the "SENT AS_PROBE" flag) if that flag is not already set. This may allow messages related to the packet exchange both to enter and to exit the GROUPING network infrastructure without causing a broadcast storm.

Using this method of broadcast communication, packets may be sent between any member of the GROUPING and a device (e.g., the portable computing device 130) to join the GROUPING on wireless and/or Ethernet networks. The device to join the GROUPING may be brand new and previously configured with a different network (e.g., the portable computing device 130 with a stale configuration in a different GROUPING). In addition, if used sparingly, these broadcast messages may not interfere with the normal operation of the network or attached devices. As a result, a communication path on an agreed channel may be established between two devices.

VI. Example Methods

Figure 6:
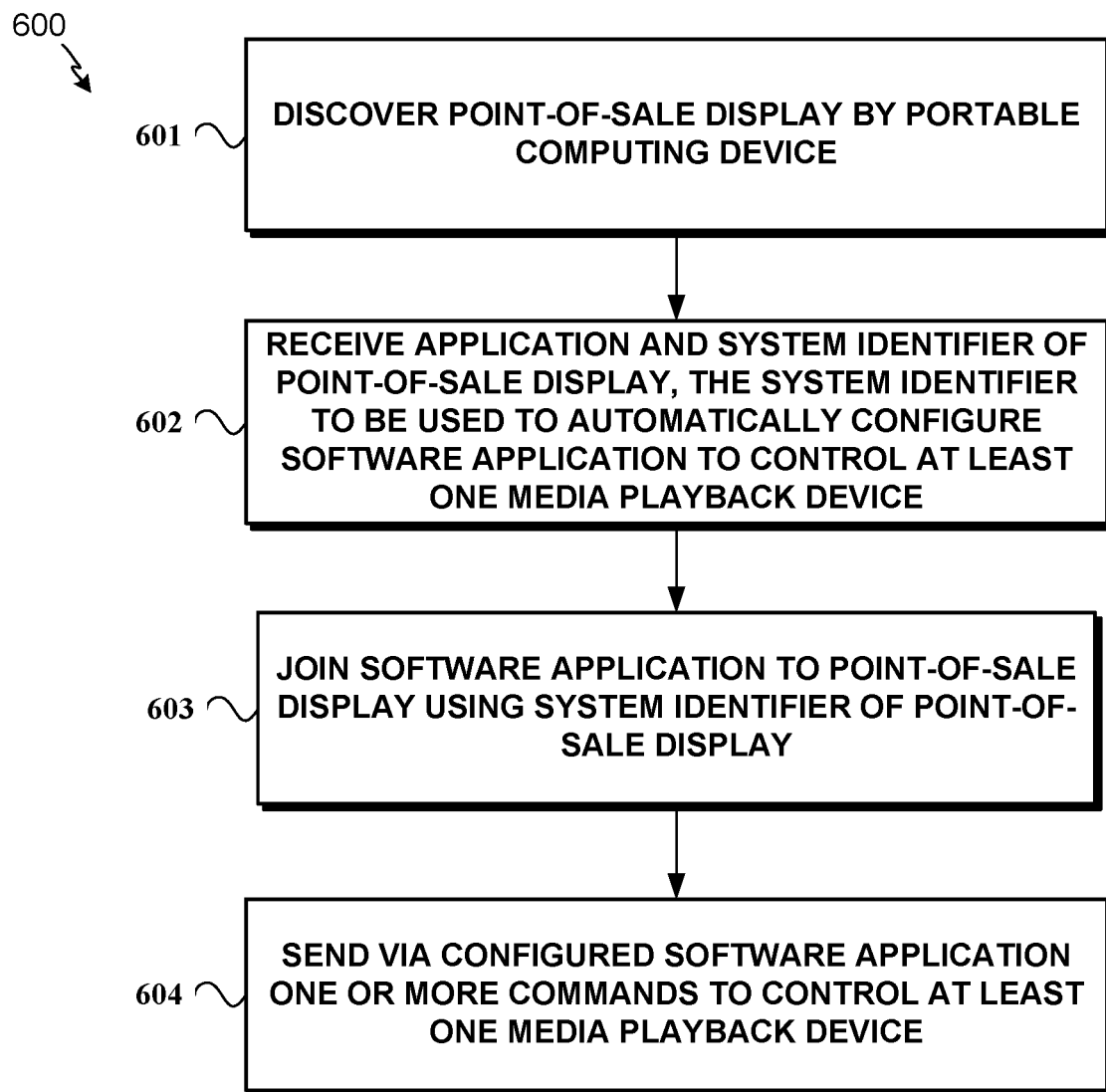
FIGS. 6 and 7 show flowcharts for discovering a POS display and receiving personalized media playback at the discovered POS display.

FIG. 6 is a flowchart depicting an example method 600 for discovering a POS display and receiving personalized media playback at the discovered POS display. Method 600 is described by way of example as being carried out by a portable computing device. For clarity, the method 600 will be described herein with reference to FIG. 1 being carried out by the portable computing device 130. However, it should be understood that the example methods described herein may be carried out by other portable computing devices and/or systems.

Furthermore, those skilled in the art will understand that the flowchart described herein depicts functionality and operation of certain implementations of example embodiments. In this regard, each block of the flowchart may represent a module, a segment, or a portion of program code, which includes one or more instructions executable by a processor for implementing specific logical functions or steps in the process. The program code may be stored on any type of computer readable medium, e.g., such as a storage device including a disk or hard drive. In addition, each block may represent circuitry that is wired to perform the specific logical functions in the process. Alternative implementations are included within the scope of the example embodiments of the present application in which functions may be executed out of order from that shown or discussed, including substantially concurrent or in reverse order, depending on the functionality involved, as would be understood by those skilled in the art.

As shown in block 601, the method 600 may involve a portable computing device discovering a POS display, where the POS display includes at least one media playback device. For example, the portable computing device 130 may discover the POS display 110 that includes the zone players 112-116.

In one embodiment, the portable computing device discovering the POS display may involve the portable computing device receiving a notification regarding the POS display. In some embodiments, the notification may indicate a location of the POS display. In other embodiments, the notification may further include a hyperlink to a software application, where the software application may be configured to control the POS display.

For example, a user with the portable computing device 130 may walk into a retail store where the example system 100 is implemented. The portable computing device 130 may connect to the data network 140 (e.g., via an access point such as a router), and the portable computing device 130 may receive a notification (e.g., from the local server 145). The notification may include textual data indicating the location of the POS display 110. In other instances, the notification may also include a hyperlink that may direct the portable computing device 130 to an electronic address of a software application (e.g., a software application stored on the media system server 150). The software application may be configured to control the POS display. Other example notifications may exist.

In some embodiments, the POS display may be associated with display barcode data that indicates an electronic address of a software application, where the software application may be configured to control the POS display. The display barcode data may or may not be part of the POS display. In one example, the display barcode data may be in physical proximity to the POS display. In other examples, the display barcode data may be located within the same environment as the POS display. In yet other examples, the display barcode data and the POS display may be located in separate environments. Other examples are also possible. The display barcode data may be a machine-readable barcode or a scannable QR code, among other examples.

In some embodiments, discovering the POS display may involve the portable computing device receiving the electronic address data via a scanning component of the portable computing device (e.g., a smartphone camera). For example, a customer may use his/her smartphone (e.g., the portable computing device 130) to scan a POS-display QR code, and the smartphone may then receive display barcode data indicating the electronic address of the software application, where the software application may be configured to control the POS display 110.

In some embodiments, discovering the POS display may involve the portable computing device receiving location data that indicates a location of the POS display. In some instances, the location data may be included in a notification received by the portable computing device. In other embodiments, the location data may be independent of a notification. The portable computing device may receive the location data over a data network from a networked device. For example, the portable computing device 130 may receive the location data from the local server 145, the media system server 150, or a third-party server (not pictured). In some embodiments, the portable computing device 130 may receive the location data from a POS-display barcode.

In one embodiment, the location data may include GPS data and/or geo-location data that indicates a location of the POS display. In other embodiments, the location data may include textual data that indicates a location of the POS display in known or easily discernible directions. For example, in the retail store environment, the data network 140 may be public a wireless network provided by the retail store to customers. The local server 145 may contain a database of POS displays and their corresponding locations within the retail store. When a customer connects his/her smartphone (e.g., the portable computing device 130) to the retail store wireless network (e.g., the data network 140), the local server 145 may transmit the location data to the portable computing device 130. The location data may display to the customer on his/her smartphone (e.g., once output at an output component of the portable computing device 130), "Go test-drive the point-of-sale display at aisle 23."

In other embodiments, discovering the POS display may involve the portable computing device transmitting device-location data indicating a current location of the portable computing device to a server (e.g., the media system server 150 or a third party server) over a data network. The portable computing device may then receive from the server location data of a POS display determined to be in close proximity to the portable computing device. For example, a user may have location services enabled on his/her smartphone, which may transmit a current location of the smartphone to a server (e.g., the media system server 150) via a data network (e.g., a wireless network or a cellular network) at predetermined intervals or continuously while the location services are enabled. In one embodiment, the user may have installed a thin-client application on his/her smartphone from the media system server 150 or a third-party that uses a current location of a user's smartphone to identify "near" POS displays. For example, a user may be walking down a street and come within a predefined proximity of an environment (e.g., a coffee shop or a retail store) that has a POS display within. Subsequently, the user may receive at his/her smartphone location data related to the POS display located within the environment. The location data may be transmitted from the media system server 150 via, for example, a cellular network. In response to the location data, an output component of the smartphone may prompt the user "Come to the coffee shop at 123 Sonos Avenue and see the POS display", among other possible prompts.

In some embodiments, after the portable computing device receives the location data, the portable computing device may cause an output component to provide an indication of the location of the POS display. In one embodiment, the portable computing device 130 may cause a graphical display to provide a visual indication of the location of the POS display. For example, the portable computing device 130 may output an image of a map with a mark on the map identifying the location of the POS display. In another example, the portable computing device 130 may output the textual message: "Go to the electronics department to test-drive the POS display", among other example messages. In other embodiments, the portable computing device 130 may include a speaker and may cause the speaker to output an audible indication of the location of the POS display. For example, the portable computing device 130 may play a recording at the speaker that outputs in a recorded voice: "Go to the electronics department to see the POS display", among other example recordings.

At block 602, the method 600 may involve the portable computing device receiving, over a wireless network, a software application and a system identifier. For example, in one embodiment, the portable computing device 130 may receive via the data network 140 a software application and a system identifier from the media system server 150. In another example, the portable computing device 130 may receive the software application and the system identifier from the POS display 110 (e.g., from one of the zone players 112-116 or the controller 118). The POS display 110 may have received the software application and/or the system identifier from the local server 145 and/or the media system server 150. In other embodiments, the portable computing device may receive the software application from a first device and the system identifier from a second device. For example, the portable computing device 130 may receive the software application from the media system server 150 and receive the system identifier from the POS display 110. Other alternatives are also possible.

In one embodiment, the system identifier may be used to automatically configure the software application to control the at least one media playback device at the discovered POS display. The system identifier is a globally unique identifier that may correspond to one or more configuration variables that cause the software application on the portable computing device to be configured to control the media system of the POS display. The system identifier may correspond to a globally unique GID and/or a unique set of configuration variables or parameters of the POS-display, such as channels (e.g., respective frequency bands), SSID and WEP keys or other security keys. For example, the system identifier may correspond to identifiers unique to the playback network 120 that may cause the computing device 130 to connect to the media system of the POS-display 110. In other embodiments, the system identifier may correspond to identifiers unique to the at least one media playback device.

In some embodiments, the software application may be configured to cause the portable computing device to carry out the same or similar operations and functions as the controller 500. For example, the software application received by the portable computing device may be the same as or similar to the software application discussed above in reference to FIG. 5.

At block 603, the method 600 may involve joining the software application on the portable computing device to the POS display using the system identifier of the POS display. Joining the software application on the portable computing device to the POS display may cause the portable computing device to be enabled to control the POS display via the software application. In some embodiments, joining the software application on the portable computing device to the POS display may involve the portable computing device joining the playback network of the POS display. For example, joining the software application on the portable computing device 130 to the POS display 110 may involve the portable computing device 130 joining the playback network 120.

In one embodiment, the portable computing device 130 may join the playback network 120 in the same or similar manner as a device joining a playback network as discussed above. In some embodiments, for example, the software application on the portable computing device 130 may use the system identifier of the POS display 110 to join the portable computing device 130 to the playback network 120. In other embodiments, the portable computing device may join the playback network by connecting directly with a zone player. For example, the portable computing device 130 may join the playback network 120 by connecting directly to one of the zone players 112-116 using, for example, Bluetooth, Wifi Direct, or a proprietary protocol, among other protocols.

In some embodiments, joining the software application on the portable computing device to the POS display may involve the portable computing device connecting to a data network (that the POS display is also connected to) and launching the software application on the portable computing device. For example, after the portable computing device 130 and the POS display 110 are both connected to the data network 140, the software application on the portable computing device 130 may be launched, and the portable computing device 130 may then control the POS display. The software application may be launched in response to receiving a user input at the portable computing device that indicates a desire to launch the software application. In some embodiments, the software application may not be launched until after the system identifier configures the software application to control the at least one media playback device at the discovered POS display.

In one embodiment, joining the software application on the portable computing device to the POS display may involve the portable computing device connecting to a data network (that the POS display is also connected to) and the portable computing device detecting that the POS display is the only POS display connected to the data network.

In other embodiments, joining the software application on the portable computing device to the POS display may involve the software application causing the portable computing device to recognize one or more GIDs and/or SSIDs and the portable computing device detecting a GID and/or SSID from the one or more GIDs and/or SSIDs transmitted from the POS display. In one embodiment, after detecting the GID and/or SID, the software application on the portable computing device may automatically join to the POS display if the software application is not yet associated with a GROUPING. In one embodiment, the joining procedures may require a user input indicating a desire to join the POS display.

In some embodiments, after joining the software application on the portable computing device to the POS display, the portable computing device may receive display data from the POS display. The display data may indicate an identifier for each of the playback devices (e.g., the zone players 112-116), an identifier for each controller (e.g., the controller 118 and/or another portable computing device acting as a controller), audio content available for playback by the at least one playback device, existing zone groups, existing synchrony groups, existing zone scenes, what audio is currently playing in one or more zones and/or at one or more zone players, and volume levels, among other data. In one embodiment, the controller may display a visual indication corresponding to the display data.

In one embodiment, after joining the software application on the portable computing device to the POS display, the method 600 may further involve indexing audio content on the portable computing device, where the audio content may be played by a media playback device subsequent to indexing. Indexing audio content may involve identifying audio content (e.g., audio files, audio applications, and/or audio content provider account information) stored on a device or otherwise associated with the device, and compiling a database of the identified audio content. The database may include file locations of the audio content, electronic addresses of the audio content, track titles, artist/band names, and audio content provider data, among other possible data. The indexing may involve a standard and/or proprietary protocol for accessing the audio content on the portable computing device (e.g., the SMB protocol, among other protocols). In some embodiments, the indexing may occur at the portable computing device. In other embodiments, the indexing may occur at the POS display (e.g., at one or more media playback devices and/or at a controller).

In one embodiment, the software application may cause the portable computing device 130 to index audio content on the portable computing device 130. The audio content may include local audio files located on the computing device 130 and/or streaming media service accounts associated with the computing device 130. In some embodiments, the computing device 130 may already index audio content without need for any action by the software application.

In other embodiments, after indexing, the portable computing device 130 may transmit indexed audio data to the POS display 110. The zone players 112-116 may then access the audio indicated by the indexed audio data. For example, any of the zone players 112-116 may access a local audio file located on the computing device 130 or may use the account information associated with the portable computing device 130 to obtain streaming media from the content provider server 152. Other examples are also possible.

In some embodiments, after indexing, the software application on the portable computing device may cause an output component of the portable computing device to output a customized view for the user based on the indexed audio data. The customized view may include indexed audio content from the portable computing device, indexed audio content from an audio service (e.g., the content provider server 152) associated with an environment (e.g., a retail or a coffee shop where the POS display is located) which may be determined based on the audio content from the portable computing device, supported music services, which may be determined by the software application automatically detecting music service applications on the portable computing device, and "Play To" capabilities from supported applications and/or devices. Other examples are also possible.

In other embodiments, a second portable computing device may also join the playback network 120 and access the audio data indicated by the indexed audio data of the portable computing device 130. Similarly, the portable computing device 130 may access the audio data of the second portable computing device. In some embodiments, a user of the portable computing device may use the software application to select whether other portable computing devices may access the audio data associated with the user's portable computing device.

In some embodiments, after joining the software application on the portable computing device to the POS display, the software application may cause the portable computing device to transmit registration data to a server associated with the POS display. The registration data may indicate a user identifier (e.g., a user name and/or cell phone number associated with the portable computing device), a location of the POS display, a time stamp of when the portable computing device joined the POS display, and a previous GROUPING(s) that the portable computing device belonged to, if any, among other examples. For example, the portable computing device 130 may transmit registration data indicating that the portable computing device 130 is associated with a GROUPING of the POS display to the media system server 150 via the data network 130. In one embodiment, user permission may be required before the registration data is transmitted. In other embodiments, the registration data is transmitted automatically.

As shown in block 604, the method 600 may involve the portable computing device sending via the configured software application one or more commands to control the at least one media playback device. For example, the portable computing device 130 may use the configured software application to send the zone player 116 (and/or other zone players) a command to play audio. In response, the zone player 116 may locate the audio, obtain an audio stream from the audio source, and output the audio at the zone player 116. In some embodiments, the audio source may be the content provider server 152 or the portable computing device 130, among other sources.

In some embodiments, the configured software application may facilitate registering a streaming service identified on the portable computing device to the POS display. For example, the software application at the portable computing device 130 may register one or more of the zone players 112-116 to receive a streaming service from the content provider server 152. In one embodiment, the streaming service may be registered to a generic or retail user account. Account data indicating the generic or retail user account may be stored at the local server 145. In other embodiments, the streaming service may be registered to the user's account, and the user's music library may be added to the media system of the POS display. The user's account data may be stored on the portable computing device.

In some embodiments, the method 600 may further involve the portable computing device terminating access to the POS display after a predefined duration. For example, the software application may cause the portable computing device 130 to terminate the access to the playback network 120 after the lapse of a predefined amount of time (e.g., 1 hour, 1 day, etc.). In other embodiments, access between the portable computing device and the POS display may terminate based on a user input at the portable computing device that indicates a desire to terminate the connection with the POS display. In some embodiments, the access may terminate based on a predefined proximity between the portable computing device and the POS display. For example, once the portable computing device 130 is a predefined distance away from the POS display 110, the connection may be terminated. In other embodiments, the access may terminate based on a measure of activity or inactivity (e.g., 10 minutes) at the portable computing device. In one embodiment, the access may terminate when the portable computing device loses connection to a data network (e.g., the data network 140). Other examples for terminating access to the POS display are also possible.

In some embodiments, after terminating access to the POS display, the portable computing device may no longer control the POS display. Additionally, the playback devices of the POS display may no longer access audio stored on the portable computing device and/or the playback devices may not use streaming media accounts associated with the portable computing device. For example, in one embodiment, after terminating access to the POS display, the software application on the portable computing device 130 may cause the POS display 110 to remove any indexed audio data associated with the portable computing device 130.

In some embodiments, the portable computing device may control the POS display without having to perform all of method 600. For example, in one embodiment, the portable computing device may have the software application installed on the portable computing device prior to discovering a POS display. In such a scenario, the portable computing device may discover the POS display and upon discovering the POS display, the portable computing device may receive data such that the software application can automatically control the POS display.

For instance, in one embodiment, a portable computing device may already have the software application, and a user may have allowed the software application to use "location services." The software application may provide a media system server current location data of the portable computing device via, for example, a cellular network or a wireless network. The current location data may indicate where the portable computing device is currently located (e.g., GPS coordinates or geo-location data). The media system server may identify POS displays nearby the current location of the portable computing device. When the portable computing device is within a predefined proximity of the location of a POS display, the media system server may send a notification to the portable computing device indicating that a POS display is nearby. Further, the media system server may provide the software application on the portable computing device a system identifier for a media system of the nearby POS display and network data (e.g., SSID, GID, channel data, etc.) such that the software application can automatically control the POS display. The software application on the portable computing device may automatically control the media system once the portable computing device connects to a network of the environment (e.g., a retail store wireless network) that the media system is also connected to.

In another embodiment where the portable computing device already has the software application installed, the software application may include a list of access point SSIDs, which may be associated with POS displays. In some embodiments, the software application may retrieve the list of access point SSIDs from a media system server via a data network (e.g., a wireless network or a cellular network). A POS display may transmit an SSID that is included in the list of access point SSIDs. The portable computing device may receive the SSID, and in response, the software application may cause the portable computing device to communicate with the POS display and exchange credentials. In one embodiment, once the credentials are confirmed, the portable computing device and the POS display may transition to a second SSID, which may allow the portable computing device to control the POS display.

In other embodiments, the method 600 may further involve using the software application to play audio on the portable computing device. For example, the portable computing device 130 may send a command to the zone player 112 to play an audio track (or an audio stream from the content provider 152). The audio track may be stored on the portable computing device 130. The zone player 112 may begin outputting the audio track. Subsequently, a user of the portable computing device 130 may decide to walk away from the POS display 110, while the zone player 112 is still playing the audio track. The software application may cause the portable computing device 130 to continue playing the audio track at the portable computing device 130. In some embodiments, the portable computing device 130 may begin to continue playing the audio track upon an input by the user indicating a desire to continue playing the audio track at the portable computing device 130. In one embodiment, the portable computing device 130 may begin to continue playing the audio track after the lapse of a predefined amount of time. In other embodiments, the portable computing device 130 may begin to continue playing the audio track once the portable computing device 130 is a predefined distance away from the POS display 110. Other examples are certainly possible.

In one embodiment, the method 600 may further involve using the portable computing device and the software application to control a second media system. That is, in some embodiments, the software application may be configured to cause the portable computing device to, at some time, control the POS display and to, at some time, control a second media system.

In particular, the method may further involve the portable computing device discovering a second media system (e.g., a home system), where the second media system may include at least one media playback device. For example, the home system may include one or more zone players and a home playback network. In one embodiment, discovering the second media system may involve the portable computing device detecting the presence of the second media system. In another embodiment, discovering the second media system may involve a user using a user interface on the portable computing device to initiate a discover procedure by the controller application on the portable computing device. The discover procedure may be similar to the procedure described above, whereby the computing device detects the presence of the second media system.

The method may further involve joining the software application on the portable computing device to the second media system using a system identifier of the second media system. Joining the software application on the portable computing device to the second media system display may cause the portable computing device to be enabled to control the second media system via the software application. In some embodiments, joining the software application on the portable computing device to the second media system may involve the portable computing device joining a playback network of the second media system.

The system identifier of the second media system may indicate a unique GID and a unique set of configuration variables or parameters of the second media system, such as channels (e.g., respective frequency bands), SSID and WEP keys or other security keys. In other embodiments, the system identifier of the second media system may indicate identifiers unique to the at least one media playback device (e.g., a zone player).

In one embodiment, the home system may include a home playback network. The system identifier of the home system may indicate identifiers unique to the home playback network, which may cause the portable computing device to join the playback network of the home system.

The method may further involve sending from the portable computing device via the software application one or more commands to control the at least one media playback device of the second media system. For example, the portable computing device may send a zone player of the home system a command to play an audio stream at the zone player. Other examples are also possible.

Figure 7:
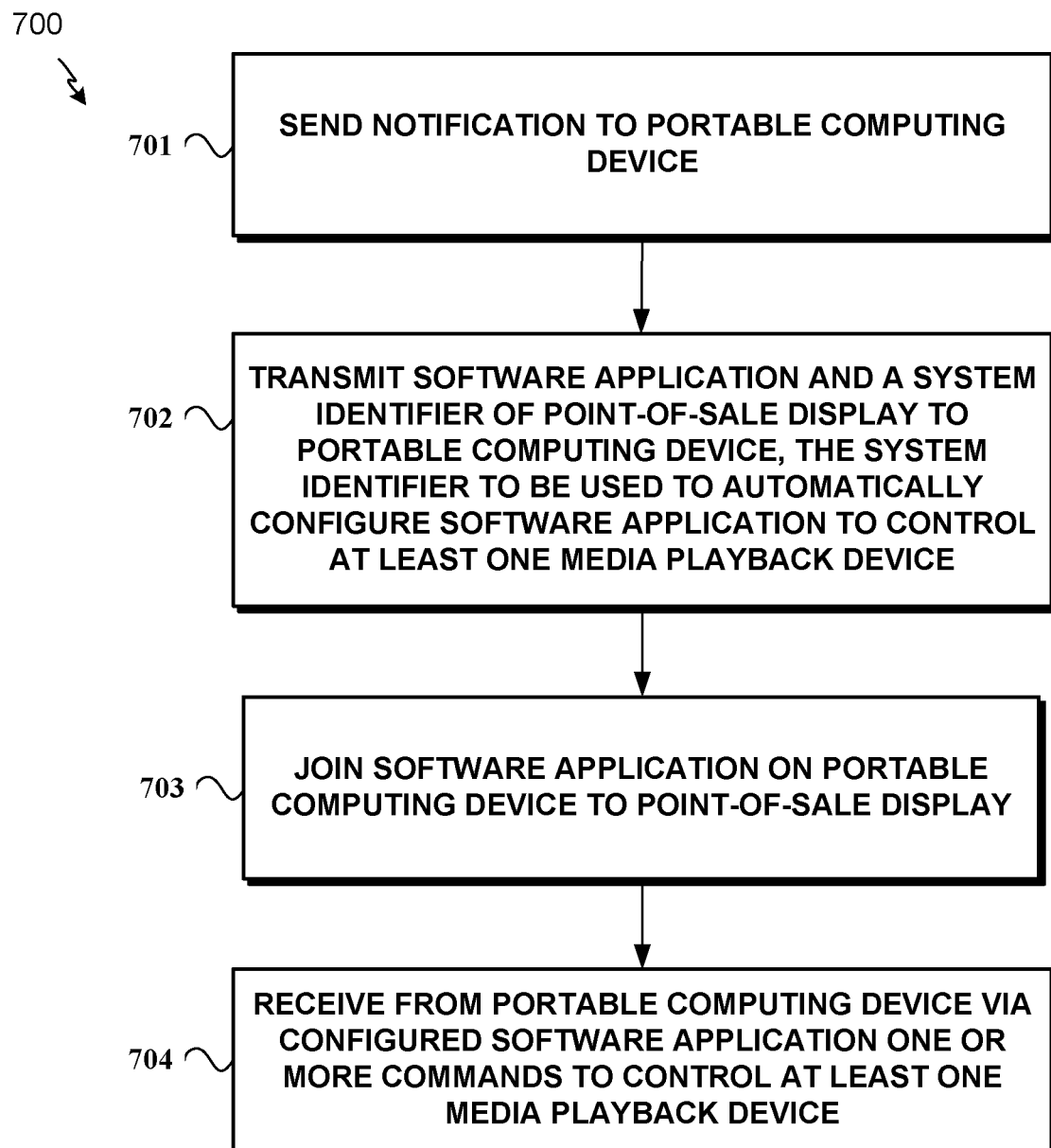

FIG. 7 is a flowchart depicting an example method 700 for discovering a POS display and receiving personalized media playback at the discovered POS display. Method 700 is described by way of example as being carried out by a portable computing device. For clarity, the method 700 will be described herein with reference to FIG. 1 being carried out by the portable computing device 130. However, it should be understood that the example methods described herein may be carried out by other portable computing devices and/or systems.

At block 701, the method 700 may involve sending a notification regarding a POS display to a portable computing device, where the POS display includes at least one media playback device. In some embodiments, the notification may include the same or similar indications as the notification described above with reference to FIG. 6. The notification may be sent by the local server 145 or the media system server 150 (or a third party server) via the data network 140 or a cellular network, among other networks. In some embodiments, the POS display 110 may include the local server 145, and the POS display 110 may send the notification via the data network 140. Other examples are also possible.

At block 702, the method 700 may involve transmitting a software application and a system identifier of the POS display to the portable computing device, where the system identifier may be used to automatically configure the software application to control the at least one media playback device. In some embodiments, the software application and the system identifier of the POS display may be the same as or similar to the software application and system identifier discussed above with respect to FIG. 6.

In one embodiment, the media system server 150 may transmit via the data network 140 the software application and the system identifier to the portable computing device 130. In another embodiment, the POS display 110 may transmit the software application and the system identifier to the portable computing device 130 (e.g., from one of the zone players 112-116 or the controller 118). The POS display 110 may have received the software application and/or the system identifier from the local server 145 and/or the media system server 150. In other embodiments, a first device may transmit the software application and a second device may transmit the system identifier. For example, the system server 150 may transmit the software application to the portable computing device 130, and the POS display 110 may transmit the system identifier to the portable computing device 130. Other alternatives are also possible.

At block 703, the method 700 may involve joining the software application on the portable computing device to the POS display. Joining the software application on the portable computing device to the POS display may cause the POS display to be controllable by the portable computing device via the software application. In some embodiments, joining the software application on the portable computing device to the POS display may involve the portable computing device joining a playback network of the POS display (e.g., the portable computing device 130 joining the playback network 120). In other embodiments, the joining procedures may be the same as or similar to the joining procedures discussed above in reference to FIG. 6.

At block 704, the method 700 may involve receiving from the portable computing device via the configured software application one or more commands to control the at least one media playback device. For example, one or more of the zone players 112-116 may receive one or more commands from the portable computing device 130 to output audio, join a synchrony group, and adjust a volume level, among other examples.

IX. Conclusion

The descriptions above disclose various example systems, methods, apparatus, and articles of manufacture including, among other components, firmware and/or software executed on hardware. However, such examples are merely illustrative and should not be considered as limiting. For example, it is contemplated that any or all of these firmware, hardware, and/or software components can be embodied exclusively in hardware, exclusively in software, exclusively in firmware, or in any combination of hardware, software, and/or firmware. Accordingly, while the following describes example systems, methods, apparatus, and/or articles of manufacture, the examples provided are not the only way(s) to implement such systems, methods, apparatus, and/or articles of manufacture.

As provided in the embodiments discussed above, the present application may allow for the discovery of a POS display and the personalized playback of media at the discovered POS display. In one aspect, a method is provided. The method involves discovering a point-of-sale display by a portable computing device. The point-of-sale display comprises at least one media playback device. The method further involves receiving, over a wireless network, by the portable computing device a software application and a system identifier of the point-of-sale display. The system identifier is to be used to automatically configure the software application to control the at least one media playback device at the discovered point-of-sale display. The method further involves joining the software application on the portable computing device to the point-of-sale display using the system identifier of the point-of-sale display. The method further involves sending from the portable computing device via the configured software application one or more commands to control the at least one media playback device.

In another aspect, a point-of-sale display system is provided. The point-of-sale display system includes a point-of-sale display. The point-of-sale display comprises at least one media playback device. The point-of-sale display further includes a wireless network and a portable computing device. The portable computing device is configured to discover the point-of-sale display. The portable computing device is further configured to receive, over the wireless network, a software application and a system identifier of the point-of-sale display. The system identifier is to be used to automatically configure the software application to control the at least one media playback device at the discovered point-of-sale display. The portable computing device is further configured to join the software application on the portable computing device to the point-of-sale display using the system identifier of the point-of-sale display. The portable computing device is further configured to send via the configured software application one or more commands to control the at least one media playback device.

In yet another aspect, a non-transitory computer readable medium is provided. The non-transitory computer readable medium has stored thereon instructions executable by at least one processor of a portable computing device to cause the portable computing device to perform functions. The instructions include instructions for discovering a point-of-sale display. The point-of-sale display comprises at least one media playback device. The instructions further include instructions for receiving, over a wireless network, a software application and a system identifier of the point-of-sale display. The system identifier is to be used to automatically configure the software application to control the at least one media playback device at the discovered point-of-sale display. The instructions further include instructions for joining the software application on the portable computing device to the point-of-sale display using the system identifier of the point-of-sale display. The instructions further include instructions for sending via the configured software application one or more commands to control the at least one media playback device Additionally, references herein to "embodiment" means that a particular feature, structure, or characteristic described in connection with the embodiment can be included in at least one example embodiment of the invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible medium such as a memory, DVD, CD, Blu-ray, and so on, storing the software and/or firmware.

The invention claimed is:

1. A method to be performed by a computing system comprising one or more servers, the method comprising:
    causing a mobile device to discover a first media playback system at a point-of-sale display, wherein the first media playback system comprises a first set of two or more playback devices that are connected via a local area network;
    after causing the mobile device to discover the first media playback system at the point- of-sale display, transmitting, via a network interface to the mobile device, instructions that cause the mobile device to download a control application to data storage of the mobile device;
    after the control application is downloaded to the mobile device, transmitting, via the network interface to the control application on the mobile device, instructions to configure the control application to remotely control the first media playback system at the point-of-sale display;
    receiving, via the network interface from the mobile device, data representing a command to play back particular audio content from a streaming audio service on the first set of two or more playback devices, wherein the mobile device is associated with account information for the streaming audio service; and
    sending, via the network interface to the first set of two or more playback devices, instructions to play back the particular audio content from the streaming audio service using the account information associated with the mobile device for the streaming audio service, wherein the first set of two or more playback devices are configured to utilize the account information associated with the mobile device for the streaming audio service to retrieve the particular audio content from the streaming audio service.

2. The method of claim 1, further comprising:
    receiving, via the network interface, data indicating that the control application is downloaded to the mobile device, wherein transmitting the instructions to configure the control application to remotely control the first media playback system at the point-of-sale display comprises:
    in response to receiving the data indicating that the control application is downloaded to the mobile device, transmitting the instructions to configure the control application to remotely control the first media playback system at the point-of-sale display.

3. The method of claim 1, wherein causing the mobile device to discover the first media playback system at the point-of-sale display comprises:
    causing a display device at the point-of-sale display to display a scannable QR code corresponding to (i) a universal resource identifier indicating a network location from where the mobile device can download the control application and (ii) an identifier distinguishing the first media playback system from other media playback systems.

4. The method of claim 1, wherein causing the mobile device to discover the first media playback system at the point-of-sale display comprises:
    receiving, via the network interface from the mobile device, data representing (i) a request to download the control application and (ii) an identifier of the first media playback system at the point-of-sale display, the identifier distinguishing the first media playback system from other media playback systems, and wherein transmitting, via the network interface to the mobile device, instructions that cause the mobile device to download the control application to data storage of the mobile device comprises:
    in response to receiving the data representing the request to download the control application, transmitting the instructions that cause the mobile device to download the control application to data storage of the mobile device.

5. The method of claim 1, wherein causing the mobile device to discover the first media playback system at the point-of-sale display comprises:
    causing the first media playback system to broadcast, via a network interface of a playback device of the first media playback system, a network discovery message, wherein receiving the broadcasted network discovery message by the mobile device causes the mobile device to transmit a response to the network discovery message.

6. The method of claim 1, further comprising:
    terminating control by the mobile device of the first media playback system after a predefined duration of time after causing the mobile device to discover the first media playback system at the point-of-sale display.

7. The method of claim 1, wherein the point-of-sale display is a first point-of-sale display in a retail location that includes one or more second media playback systems at respective second point-of-sale displays, and wherein the method further comprises:
    causing the mobile device to discover a particular second media playback system at another point-of-sale display, wherein the second media playback system comprises a second set of two or more playback devices that are connected via a local area network; and
    after causing the mobile device to discover the second media playback system at the another point-of-sale display, transmitting, via the network interface to the control application on the mobile device, instructions to configure the control application to remotely control the second media playback system at the another point-of-sale display, wherein the control application ceases to remotely control the first media playback system when configured to remotely control the second media playback system.

8. The method of claim 1, further comprising:
    causing, via the network interface, a music library control interface of the control application at the mobile device to display indications of audio tracks available at one or more streaming audio services registered with the first media playback system.

9. The method of claim 8, further comprising:
    transmitting, via the network interface, instructions to index audio tracks on the mobile device; and
    causing the music library control interface of the control application at the mobile device to display indications of the indexed audio tracks on the mobile device, wherein the indexed audio tracks on the mobile device are playable on the first set of two or more playback devices.

10. The method of claim 1, further comprising:
transmitting, to the mobile device, instructions to join the local area network connecting the first set of two or more playback devices.

11. A tangible, non-transitory, computer-readable medium storing instructions that, when executed by one or more processors, cause a computing system to perform functions comprising:
causing a mobile device to discover a first media playback system at a point-of-sale display, wherein the first media playback system comprises a first set of two or more playback devices that are connected via a local area network;
after causing the mobile device to discover the first media playback system at the point-of-sale display, transmitting, via a network interface to the mobile device, instructions that cause the mobile device to download a control application to data storage of the mobile device;
after the control application is downloaded to the mobile device, transmitting, via the network interface to the control application on the mobile device, instructions to configure the control application to remotely control the first media playback system at the point-of-sale display;
receiving, via the network interface from the mobile device, data representing a command to play back particular audio content from a streaming audio service on the first set of two or more playback devices, wherein the mobile device is associated with account information for the streaming audio service; and
sending, via the network interface to the first set of two or more playback devices, instructions to play back the particular audio content from the streaming audio service using the account information associated with the mobile device for the streaming audio service, wherein the first set of two or more playback devices are configured to utilize the account information associated with the mobile device for the streaming audio service to retrieve the particular audio content from the streaming audio service.

12. The tangible, non-transitory, computer-readable medium of claim 11, wherein the functions further comprise:
receiving, via the network interface, data indicating that the control application is downloaded to the mobile device, wherein transmitting the instructions to configure the control application to remotely control the first media playback system at the point-of-sale display comprises:
in response to receiving the data indicating that the control application is downloaded to the mobile device, transmitting the instructions to configure the control application to remotely control the first media playback system at the point-of-sale display.

13. The tangible, non-transitory, computer-readable medium of claim 11, wherein causing the mobile device to discover the first media playback system at the point-of-sale display comprises:
causing a display device at the point-of-sale display to display a scannable QR code corresponding to (i) a universal resource identifier indicating a network location from where the mobile device can download the control application and (ii) an identifier distinguishing the first media playback system from other media playback systems.

14. The tangible, non-transitory, computer-readable medium of claim 11, wherein causing the mobile device to discover the first media playback system at the point-of- sale display comprises:
receiving, via the network interface from the mobile device, data representing (i) a request to download the control application and (ii) an identifier of the first media playback system at the point-of-sale display, the identifier distinguishing the first media playback system from other media playback systems, and wherein transmitting, via the network interface to the mobile device, instructions that cause the mobile device to download the control application to data storage of the mobile device comprises:
in response to receiving the data representing the request to download the control application, transmitting the instructions that cause the mobile device to download the control application to data storage of the mobile device.

15. The tangible, non-transitory, computer-readable medium of claim 11, wherein the point-of-sale display is a first point-of-sale display in a retail location that includes one or more second media playback systems at respective second point-of-sale displays, and wherein the functions further comprise:
causing the mobile device to discover a particular second media playback system at another point-of-sale display, wherein the second media playback system comprises a second set of two or more playback devices that are connected via a local area network; and
after causing the mobile device to discover the second media playback system at the another point-of-sale display, transmitting, via the network interface to the control application on the mobile device, instructions to configure the control application to remotely control the second media playback system at the another point-of-sale display, wherein the control application ceases to remotely control the first media playback system when configured to remotely control the second media playback system.

16. A computing system comprising:
a network interface;
one or more processors;
data storage storing instructions that when executed by the one or more processors cause the computing system to perform functions comprising:
causing a mobile device to discover a first media playback system at a point-of-sale display, wherein the first media playback system comprises a first set of two or more playback devices that are connected via a local area network;
after causing the mobile device to discover the first media playback system at the point- of-sale display, transmitting, via the network interface to the mobile device, instructions that cause the mobile device to download a control application to data storage of the mobile device;
after the control application is downloaded to the mobile device, transmitting, via the network interface to the control application on the mobile device, instructions to configure the control application to remotely control the first media playback system at the point-of-sale display;

receiving, via the network interface from the mobile device, data representing a command to play back particular audio content from a streaming audio service on the first set of two or more playback devices, wherein the mobile device is associated with account information for the streaming audio service; and sending, via the network interface to the first set of two or more playback devices, instructions to play back the particular audio content from the streaming audio service using the account information associated with the mobile device for the streaming audio service, wherein the first set of two or more playback devices are configured to utilize the account information associated with the mobile device for the streaming audio service to retrieve the particular audio content from the streaming audio service.

17. The computing system of claim 16, wherein the functions further comprise:

receiving, via the network interface, data indicating that the control application is downloaded to the mobile device, wherein transmitting the instructions to configure the control application to remotely control the first media playback system at the point-of-sale display comprises:

in response to receiving the data indicating that the control application is downloaded to the mobile device, transmitting the instructions to configure the control application to remotely control the first media playback system at the point-of-sale display.

18. The computing system of claim 16, wherein causing the mobile device to discover the first media playback system at the point-of-sale display comprises:

causing a display device at the point-of-sale display to display a scannable QR code corresponding to (i) a universal resource identifier indicating a network location from where the mobile device can download the control application and (ii) an identifier distinguishing the first media playback system from other media playback systems.

19. The computing system of claim 16, wherein causing the mobile device to discover the first media playback system at the point-of-sale display comprises:

receiving, via the network interface from the mobile device, data representing (i) a request to download the control application and (ii) an identifier of the first media playback system at the point-of-sale display, the identifier distinguishing the first media playback system from other media playback systems, and wherein transmitting, via the network interface to the mobile device, instructions that cause the mobile device to download the control application to data storage of the mobile device comprises:

in response to receiving the data representing the request to download the control application, transmitting the instructions that cause the mobile device to download the control application to data storage of the mobile device.

20. The computing system of claim 16, wherein the point-of-sale display is a first point-of-sale display in a retail location that includes one or more second media playback systems at respective second point-of-sale displays, and wherein the functions further comprise:

causing the mobile device to discover a particular second media playback system at another point-of-sale display, wherein the second media playback system comprises a second set of two or more playback devices that are connected via a local area network; and after causing the mobile device to discover the second media playback system at the another point-of-sale display, transmitting, via the network interface to the control application on the mobile device, instructions to configure the control application to remotely control the second media playback system at the another point-of-sale display, wherein the control application ceases to remotely control the first media playback system when configured to remotely control the second media playback system.

* * * * *